US012784530B2

(12) United States Patent
Donaghey

(10) Patent No.: US 12,784,530 B2
(45) Date of Patent: Nov. 3, 2026

(54) VENDING MACHINE SYSTEM

(71) Applicant: SodaX Pty Ltd, Scoresby (AU)

(72) Inventor: Andrew Donaghey, Mulgrave (AU)

(73) Assignee: SodaX Pty Ltd, Scoresby (AU)

( * ) Notice: Subject to any disclaimer, the term of this patent is extended or adjusted under 35 U.S.C. 154(b) by 43 days.

(21) Appl. No.: 18/049,812

(22) Filed: Oct. 26, 2022

(65) Prior Publication Data

US 2023/0138605 A1 May 4, 2023

Related U.S. Application Data

(63) Continuation of application No. PCT/AU2021/050379, filed on Apr. 27, 2021.

(30) Foreign Application Priority Data

Apr. 27, 2020 (AU) ................................ 2020901325
Mar. 15, 2021 (AU) ................................ 2021900743

(51) Int. Cl.
*G07F 17/00* (2006.01)
*G06Q 20/18* (2012.01)
*G07F 9/00* (2006.01)
*G06Q 20/32* (2012.01)

(52) U.S. Cl.
CPC ......... *G07F 17/0042* (2013.01); *G06Q 20/18* (2013.01); *G07F 9/001* (2020.05)

(58) Field of Classification Search
CPC ........ G07F 9/001; G07F 9/002; G07F 7/0609; G06Q 20/18; G06Q 20/32
USPC ........................................................... 705/21
See application file for complete search history.

(56) References Cited

U.S. PATENT DOCUMENTS 4,778,042 A 10/1988 Warren et al.
5,720,547 A * 2/1998 Baird .................. A47B 87/008 312/107
5,829,630 A 11/1998 Fernald
6,192,296 B1 2/2001 Colmant et al.
6,553,128 B1 4/2003 Jouvaud
6,746,201 B1 6/2004 Cradeur et al.
(Continued)

FOREIGN PATENT DOCUMENTS

CN 104536671 A * 4/2015 ............ G06Q 10/00
EP 0848359 A1 6/1998
(Continued)

*Primary Examiner* — Luna Champagne
(74) *Attorney, Agent, or Firm* — Stephen J. Kenny; Nicole A. Bustos-Pomerantz; Foley Hoag LLP

(57) ABSTRACT

A method for remotely controlling a $CO_2$ gas cylinder vending machine system, the method including displaying a remote vending machine user interface on a display of a user device, receiving on the user device user input indicating a desire to engage with the vending machine system to perform at least one of the following operations (a) return a $CO_2$ cylinder; (b) purchase a $CO_2$ cylinder; or (c) exchange a $CO_2$ cylinder. The method including transmitting the user input over a communications network to a communications interface of the vending machine system, receiving the user input at the communication interface of the vending machine system and controlling the vending machine system, by a controller, based on the received user input.

6 Claims, 18 Drawing Sheets

(56) References Cited

U.S. PATENT DOCUMENTS

| | | | |
|---|---|---|---|
| 7,228,989 | B2 | 6/2007 | Bhatti et al. |
| 7,909,206 | B2 | 3/2011 | Davis, Jr. |
| 8,113,382 | B1 | 2/2012 | Piersant et al. |
| 9,275,508 | B1 | 3/2016 | Lavra et al. |
| 10,078,933 | B2 | 9/2018 | Clark et al. |
| 10,580,067 | B1 | 3/2020 | Cho et al. |
| 2003/0042269 | A1 | 3/2003 | Blong |
| 2007/0034681 | A1 | 2/2007 | Kamiya et al. |
| 2014/0353998 | A1 | 12/2014 | White et al. |
| 2016/0047181 | A1 | 2/2016 | Sipos |
| 2016/0098695 | A1 | 4/2016 | Lavra et al. |
| 2016/0180628 | A1 | 6/2016 | Clark |
| 2016/0240032 | A1 | 8/2016 | Agor et al. |
| 2016/0284153 | A1 | 9/2016 | Tansey, Jr. et al. |
| 2016/0364930 | A1 | 12/2016 | Chalise et al. |
| 2017/0053099 | A1 | 2/2017 | Coughlin et al. |
| 2017/0140600 | A1 | 5/2017 | Halsey, Jr. et al. |
| 2017/0337722 | A1* | 11/2017 | Sullivan ............. G06Q 20/3224 |
| 2019/0082297 | A1* | 3/2019 | Poda ..................... H04W 4/024 |
| 2023/0129968 | A1 | 4/2023 | Donaghey |
| 2023/0135405 | A1 | 5/2023 | Donaghey |
| 2023/0138605 | A1 | 5/2023 | Donaghey |
| 2024/0078620 | A1 | 3/2024 | Morris et al. |

FOREIGN PATENT DOCUMENTS

| | | | | |
|---|---|---|---|---|
| JP | H03226898 | A | 10/1991 | |
| JP | H11269442 | A | 10/1999 | |
| JP | 2006-288946 | A | 10/2006 | |
| JP | 2008-041031 | A | 2/2008 | |
| JP | 2008-097219 | A | 4/2008 | |
| JP | 2008-197806 | A | 8/2008 | |
| JP | 2011-145987 | A | 7/2011 | |
| JP | 2018-092380 | A | 6/2018 | |
| JP | 6522838 | B1 | 5/2019 | |
| JP | 2019-113924 | A | 7/2019 | |
| WO | WO-2015089096 | A1 * | 6/2015 | ............... B67D 7/04 |
| WO | WO-2016074924 | A1 * | 5/2016 | .............. F17C 13/02 |
| WO | WO-2020161159 | A1 * | 8/2020 | .............. F17C 5/007 |

* cited by examiner

VENDING MACHINE SYSTEM

CROSS-REFERENCE TO RELATED APPLICATIONS

This application is a continuation of International Application PCT/AU2021/050379, filed on Apr. 27, 2021, which claims priority to Australian Patent Application Nos. 2021900743, filed on Mar. 15, 2021 and 2020901325, filed on Apr. 27, 2020. The entirety of each of these applications are hereby incorporated herein by reference.

TECHNICAL FIELD

The present invention relates to a vending machine system, a bin assembly, an array of bin assemblies and a vending machine.

BACKGROUND

A popular way to make your own bubbly drinks at home is by way of a sparkling water maker, such as the one made by SodaStream™. The sparkling water makers typically come with:

(a) sparkling drink maker housing;
(b) a plastic carbonating bottle; and
(c) a $C0_2$ cylinder.

Usage of the sparkling water maker depletes the $CO_2$ in the cylinder and, as such, the cylinder will need to be replaced from time to time.

The cylinders are currently swapped in one of the following ways:

1. Swap Your Cylinder On Shelf In-Store
   a. Customer goes to a store, such as Big W™, where the empty cylinder can be swapped;
   b. Customer grabs off the shelf a full cylinder in box;
   c. Customer take the new cylinder to the checkout;
   d. The cashier scans the bar code of the new cylinder and the cash register displays the full cylinder price;
   e. The cashier scans the empty cylinder and the cash register displays:
      i. the exchange price reduction; and
      ii. the exchange price; and
   g. The customer then pays the exchange price and takes the full cylinder home.
2. Swap Your Cylinder at the Counter Take your empty SodaStream™ cylinder to the counter at your local Target™, Myer™, Kmart™, or David Jones™ to swap for a full one, with a customer assistant.

a. Customer goes to store, such as Kmart™, with an empty cylinder;
   b. Customer requests the store attendant to exchange an empty cylinder for a full one;
   c. Store attendant takes customer's empty cylinder;
   d. Store attendant gets a full cylinder from behind the counter and scans the barcode;
   e. The cash register displays the exchange price; and
   f. The customer then pays the exchange price and takes the full cylinder home.

It may not be convenient for the customer to travel all the way to a store to swap the cylinder in the manner set out in items 1 and 2 above. This may particularly be the case when the weather is inclement and/or travel is restricted.

Further, the above described system relies on the cashier, and ultimately the store owner, collecting the empty cylinders and contacting the sparkling water maker for collection and refilling. A difficulty here is that the sparkling water maker does not know, at any given point in time, how many empty cylinders are being collected by the stores that they supply. Further again, how human error may lead to cylinders not being collected in total by the store. They tend to go missing.

In an attempt to address some of the above issues, the replacement process has been localised at some petrol stations, such as those including a Coles Express™ Store. The improved process includes the steps of:

a. Customer goes to petrol station stocking the replacement cylinders with an empty cylinder;
b. Cashier scans the bar code of the empty cylinder or a pre-printed bar code;
c. The cash register displays the exchange price;
d. The customer then pays the exchange price;
e. The customer is given a key to the cage of replacement cylinders;
f. Customer unlocks the cage and replaces the empty cylinder with a full one; and
g. The customer returns the key to the cashier and takes the full cylinder home.

Being able to swap a cylinder at a local petrol station may be more convenient than travelling to a large store. However, the above described process is time consuming and relies on a large number of mechanical human steps, including the locking and unlocking of cages. Issues can arise with theft, for example, where the customer does not lock the cage properly. Also, the lack of security with the cage lends itself to the customer taking more than one cylinder without paying.

Also, as per processes 1 and 2, the petrol station process still relies on the cashier, and ultimately the store owner, collecting the empty cylinders and contacting the sparkling water maker for collection and refilling. Again the difficulty here is that the sparkling water maker does not know, at any given point in time, how many empty cylinders are being collected by the stores that they supply. Further again, how human error may lead to cylinders not being collected in total by the store. They tend to go missing.

Processes 1 and 2 also require the customer to directly interact with another person (i.e., the store assistant or cashier). For example, the customer must give the empty cylinder to the store assistant or cashier, and may be given the new cylinder directly by the store assistant or cashier. This process lends itself to hygiene risks and the spread of disease due to one or both of the following:

a. close proximity between individuals to facilitate the exchange of the cylinders; and
b. physical touching of the cylinders.

Furthermore, a customer accessing a cage of replacement cylinders can touch multiple surfaces, including:

a. the key to access the cage;
b. the lock on the cage; and
c. cylinders in the cage, including cylinders which they do not take but will later be claimed by other customers.

It is generally desirable to overcome or ameliorate one or more of the above described difficulties, or to at least provide a useful alternative.

SUMMARY

In accordance with the invention, there is provided a method for remotely controlling a $CO_2$ gas cylinder vending machine system, the method including:

displaying a remote vending machine user interface on a display of a user device;

receiving on the user device user input indicating a desire to engage with the vending machine system to perform at least one of the following operations:

(a) return a $CO_2$ cylinder;

(b) purchase a $CO_2$ cylinder; or (c) exchange a $CO_2$ cylinder;

transmitting the user input over a communications network to a communications interface of the vending machine system;

receiving the user input at the communication interface of the vending machine system; and controlling the vending machine system, by a controller, based on the received user input.

Preferably, the method further includes the step of receiving, at a communications module of the user device, the remote vending machine user interface from the vending machine system.

Preferably, the method further includes:

the user device:

scanning, by a camera of the user device, indicia uniquely identifying the vending machine system, wherein the indicia encodes a Uniform Resource Locator (URL) associated with the vending machine system;

decoding the scanned indicia and retrieving the URL;

sending a request to a server based on the URL via the communications network; and receiving, via a response from the server, the remote vending machine user interface from the vending machine system, and the server:

receiving the request based on the URL from the user device; and sending in a response the remote vending machine user interface to the user device via the communications network.

Advantageously, the method further includes:

the user device transmitting a request to the vending machine system to use the vending machine system; and the vending machine system receiving the request from the user device to use the vending machine system.

Further, the method includes:

the vending machine system determining, based on the request, a proximity of the user device to the vending machine system;

the vending machine system determining, based on the determined proximity, whether the user device is within a proximity threshold distance to the vending machine system; and if the user device is within the proximity threshold distance, controlling the vending machine system by the controller based on further user input.

In accordance with the invention, there is also provided, a method for remotely controlling a $CO_2$ gas cylinder vending machine system on a user device, the method including:

displaying a remote vending machine user interface on a display of the user device;

receiving on the user device user input indicating a desire to engage with the vending machine system to perform at least one of the following operations:

(a) return a $CO_2$ cylinder;

(b) purchase a $CO_2$ cylinder; or (c) exchange a $CO_2$ cylinder;

transmitting the user input over a communications network to a communications interface of the vending machine system.

The method preferably further includes:

scanning, by a camera of the user device, indicia uniquely identifying the vending machine system, wherein the indicia encodes a Uniform Resource Locator (URL) associated with the vending machine system;

decoding the scanned indicia and retrieving the URL;

sending a request to a server based on the URL via the communications network; and receiving, via a response from the server, the remote vending machine user interface from the vending machine system.

In accordance with the invention, there is also provided, a method for remotely controlling a $CO_2$ gas cylinder vending machine system, the method including:

receiving user input at a communication interface of the vending machine system;

controlling the vending machine system, by a controller, based on the received user input, wherein the user input is conducted on a user device, and indicates a desire to engage with the vending machine system to perform at least one of the following operations:

(a) return a $CO_2$ cylinder;

(b) purchase a $CO_2$ cylinder; or (c) exchange a $CO_2$ cylinder.

Preferably, the method further includes the step of receiving a request from the user device to use the vending machine system.

Preferably, the method further includes:

determining, based on the request, a proximity of the user device to the vending machine system;

determining, based on the determined proximity, whether the user device is within a proximity threshold distance to the vending machine system; and the controller only controlling the vending machine system based on the received user input if the user device is within the proximity threshold distance.

In accordance with the present invention, there is also provided, a vending machine system for $CO_2$ gas cylinders, the system including a controller in communication with a contactless user interface, a contactless payment system and an array of bin assemblies, wherein each one of the bin assemblies is shaped to at least partially receive an end of a $CO_2$ gas cylinder and includes a locking system for releasably securing therein a $CO_2$ gas cylinder, said system for performing the steps of:

(a) receiving user input through the contactless user interface; and (b) at least one of (i) to (iii):

(i) if the user input represents a desire to exchange a $CO_2$ gas cylinder, then the system performs the steps of:

(A) receiving payment from the user through the payment system for a replacement $CO_2$ gas cylinder;

(B) receiving a $CO_2$ gas cylinder in a first one of said bin assemblies; and (C) the locking system releasing a full $CO_2$ gas cylinder located in a second one of said bin assemblies for collection by the user, (ii) if said user input represents a desire to purchase a full $CO_2$ gas cylinder without replacement, then the system performs the steps of:

(A) receiving payment from the user through the payment system for a full $CO_2$ gas cylinder without replacement; and (B) the locking system releasing a full $CO_2$ gas cylinder located in a third one of said bin assemblies for collection by the user, and (iii) if said user input represents a desire to return an empty $CO_2$ gas cylinder without replacement, then the system performs the steps of:

(A) receiving an item in one of said bin assemblies;

(B) the locking system locking the $CO_2$ gas cylinder in said one of said bin assemblies; and (C) issuing a credit to the user through the payment system for return of $CO_2$ gas cylinder without replacement.

Preferably, the contactless user interface includes at least one sensor button.

In accordance with the invention, there is also provided, a vending machine system for exchanging $CO_2$ gas cylinders, the system including a controller in communication with a user interface, a payment system and an array of bin assemblies, wherein each one of the bin assemblies is shaped to at least partially receive an end of a $CO_2$ gas cylinder and includes a locking system for releasably securing therein a $CO_2$ gas cylinder, said system for performing the steps of:

(a) receiving user input through the user interface; and (b) if the user input represents a desire to exchange a $CO_2$ gas cylinder, then the system performs the steps of:

(i) receiving payment from the user through the payment system for a replacement $CO_2$ gas cylinder;

(ii) receiving a $CO_2$ gas cylinder in a first one of said bin assemblies; and (iii) the locking system releasing a full $CO_2$ gas cylinder located in a second one of said bin assemblies for collection by the user, wherein the system includes an external door arranged to overlie the array of bin assemblies to inhibit ingress of contaminants therein.

Preferably, the door is releasably secured in position by the controller.

The vending machine system can be installed in any convenient location with 24 hour access. Customers (also referred to as "users") can use the vending machine system to swap an empty $CO_2$ gas cylinder for a full $CO_2$ gas cylinder.

Being able to swap a cylinder at a local vending machine of the above described type is more convenient than travelling to a large store. Furthermore, exchanging $CO_2$ gas cylinder using the above described vending machine minimises reliance on human steps for locking and unlocking of cages. The vending machine makes theft of $CO_2$ gas cylinders more difficult.

Further, the vending machine securely collects and safely stores returned $CO_2$ gas cylinders. As such, accurate stock of cylinders is maintained by the vending machine.

BRIEF DESCRIPTION OF THE DRAWINGS

Preferred embodiments of the invention are hereafter described, by way of non-limiting example only, with reference to the accompanying drawings, in which.

DETAILED DESCRIPTION

Figure 1:
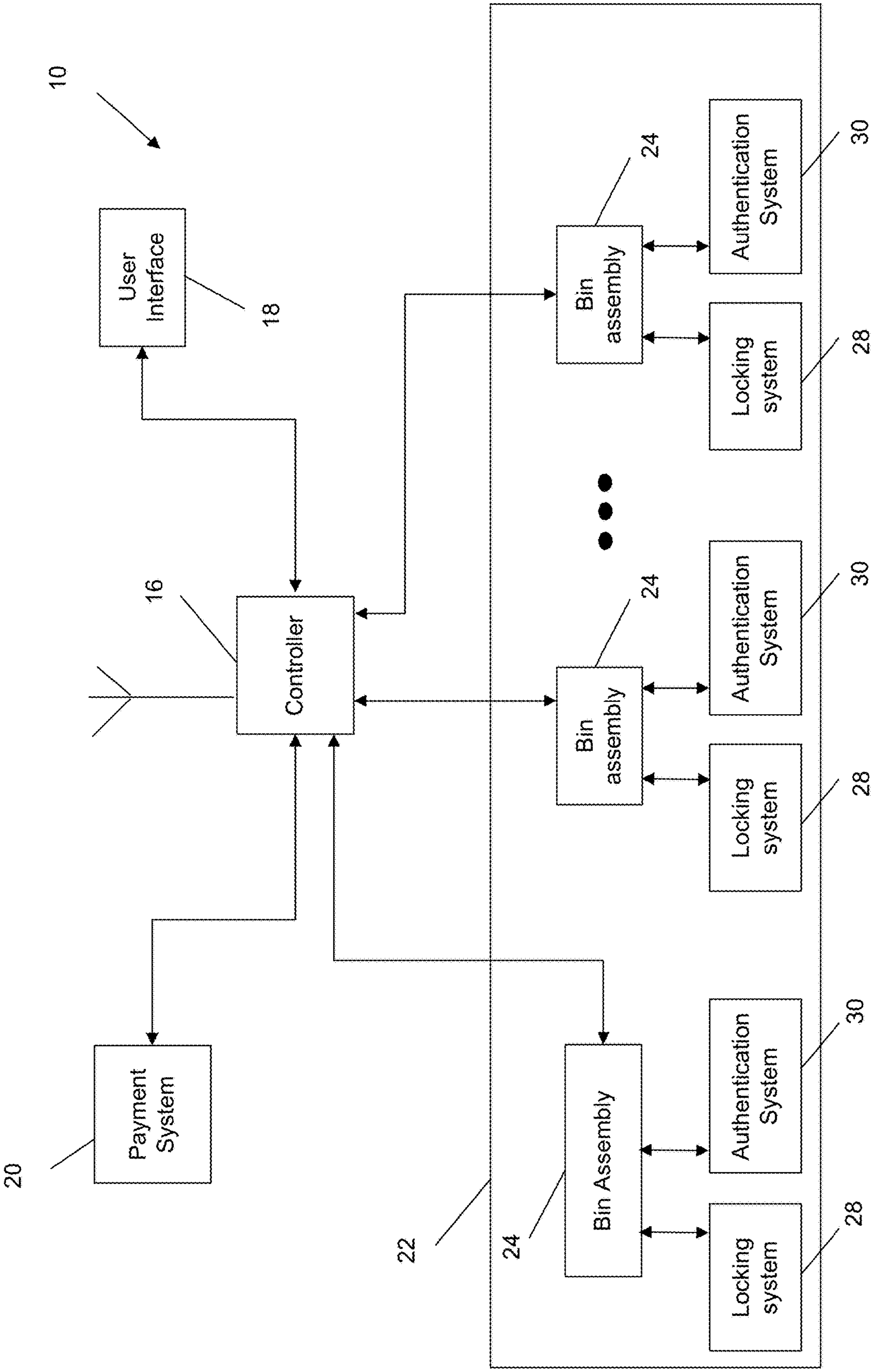
FIG. 1 is a schematic diagram of a vending machine system.
Figure 2:
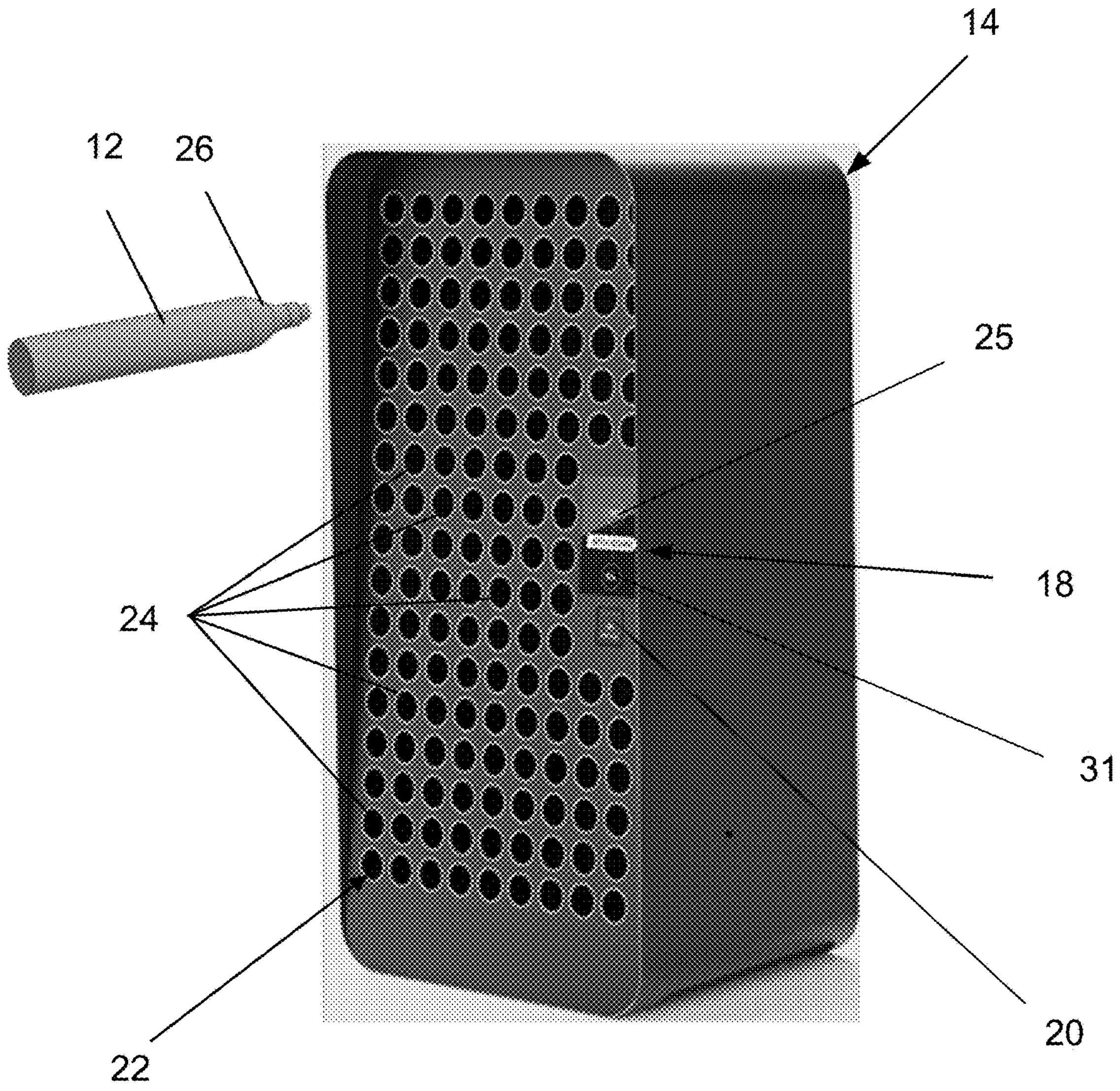
FIG. 2 is a perspective view of a $CO_2$ cylinder and a vending machine that embodies the system of FIG. 1.

The vending machine system 10 shown in FIG. 1 is used for exchanging $CO_2$ gas cylinders 12. The system 10 is advantageously embodied as a standalone vending machine 14 as shown in FIG. 2 for swapping and buying new $CO_2$ cylinders. Alternatively, the components of the system 10 can be distributed over different locations and are in communication on standard communication networks using standard communication protocols.

The vending machine 14 can be installed in any convenient location with 24 hour access, for example. Customers (also referred to as "users") can use the vending machine 14 to swap an empty $CO_2$ gas cylinder 12 for a full $CO_2$ gas cylinder.

As shown in FIG. 1, the system 10 includes a controller 16 in communication with a user interface 18, a payment system 20 and an array 22 of bin assemblies. Each one of the bin assemblies 24 is shaped to at least partially receive an end 26 of a $CO_2$ gas cylinder 12 and includes a locking system 28 for releasably securing therein a $CO_2$ gas cylinder 12.

Advantageously, the system 10 also includes an authentication system 30 for confirming that an item received therein is a legitimate $CO_2$ gas cylinder 12.

Figure 3:
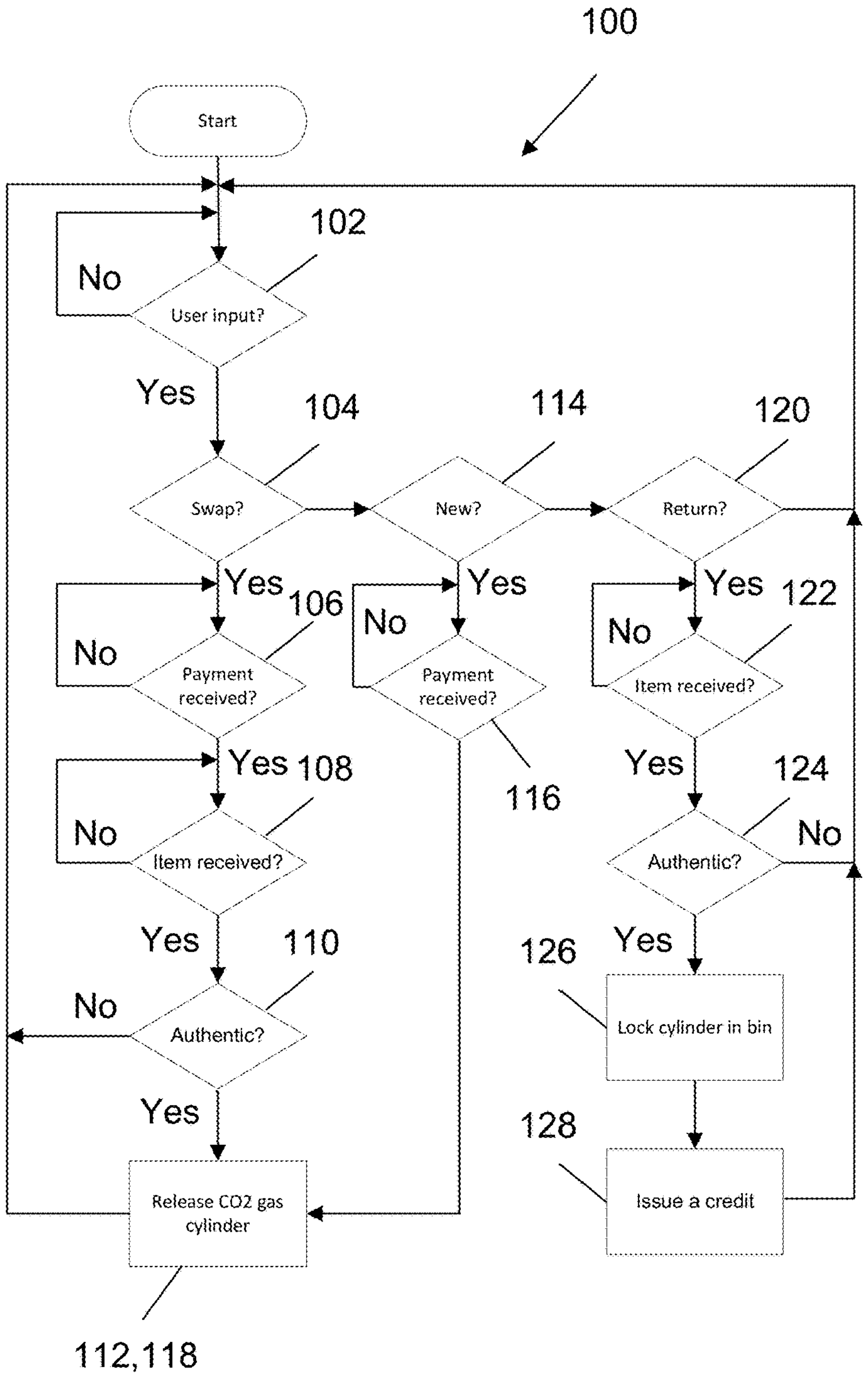
FIG. 3 is a flow diagram showing steps performed by the system shown in FIG. 1.

The system 10 performs the process 100 shown in FIG. 3, including the step of receiving, at step 102, user input through the user interface 18. If, at step 104, the user input represents a desire to exchange a $CO_2$ gas cylinder, then the system 10 performs the steps of:

(a) receiving, at step 106, payment from the user through the payment system 20 for a replacement $CO_2$ gas cylinder 12;

(b) receiving, at step 108, an item in a first one of the bin assemblies 24;

(c) confirming, at step 110, through the authentication system 30 that the item is a legitimate $CO_2$ gas cylinder; and (d) the locking system 28 releasing, at step 112, a full $CO_2$ gas cylinder 12 located in a second one of the bin assemblies 24 for collection by the user.

Advantageously, steps 106 and 108 can be performed in any order. For example, the step 106 of receiving payment can occur after the step 108 of receiving the item. In this embodiment, the step 102 of receiving user input could advantageously be equivalent to the step 108 of receiving an item. To this end, a customer could initiate an exchange by simply inserting a spent $CO_2$ gas cylinder into an empty bin assembly 24.

The user interface 18 shown in FIG. 2 includes a "Swap" function button 25 that is used to represent a desire to exchange a $CO_2$ gas cylinder 12.

The user can perform this function by simply inserting the expired $CO_2$ cylinder 12 into an empty bin assembly 24 in the array 22, making a selection through the user interface 18 and making a payment through the payment system 20. The process is efficient and convenient with minimal human interaction. No issues arise with theft.

Further, the returned empty $CO_2$ gas cylinders 12 are securely stored in the machine 14. As such, there are no issues with the cylinders 12 not being collected properly by cashiers and cylinders 12 going missing.

In order to release a $CO_2$ gas cylinder 12, the controller 16 electronically triggers the locking system 28 on an appropriate bin assembly 24 to open. In response to this request, the locking system 28 releases the cylinder 12 to the user.

The step, 112, of releasing the $CO_2$ gas cylinder 12 preferably includes the step of identifying a suitable cylinder 12 to release. Advantageously, the locking system 28 releases a full $CO_2$ gas cylinder 12 from a bin 24 in the array 22 that is closest to the bin 24 where the empty $CO_2$ gas cylinder 12 was returned.

The system 10 preferably illuminates an LED ring on the empty bin assembly 24 selected to receive the empty $CO_2$ gas cylinder 12 from the user.

If, at step 114, the user input received represents a desire to purchase a full $CO_2$ gas cylinder 12 without replacement, then the system 10 performs the steps of:

(a) receiving, at step 116, payment from the user through the payment system 20 for a full $CO_2$ gas cylinder 12 without replacement; and (b) the locking system 28 releasing, at step 118, a full $CO_2$ gas cylinder 12 located in one of the bin assemblies 24 for collection by the user.

The user interface 18 shown in FIG. 2 includes a "New" function button 31 that is used to represent a desire to purchase a full $CO_2$ gas cylinder 12 without replacement.

The step 118 of releasing the $CO_2$ gas cylinder 12 preferably further includes the steps of:

(a) engaging a height measurement system to measure a height of the user; and (b) the locking system 28 identifying a bin assembly 24 with a full $CO_2$ gas cylinder 12 that is closest to the height of the user.

In doing so, the system 10 releases a cylinder 12 in a bin assembly 24 that relates to the height of the user:

short person/disabled person, lower bin assembly 24 selected tall person, higher bin assembly 24 selected.

If, at step 120, the user input represents a desire to return an empty $CO_2$ gas cylinder 12 without replacement, then the system 10 performs the steps of:

(a) receiving, at step 122, an item in one of the bin assemblies 24;

(b) confirming, at step 124, through the authentication system 30 that the item is a legitimate $CO_2$ gas cylinder 12;

(c) the locking system locking, at step 126, the cylinder 12 in the bin assemblies 24;

(d) issuing, at step 128, a credit to the user through the payment system 20 for return of $CO_2$ gas cylinder 12 without replacement.

The system 10 preferably illuminates an LED ring on the empty bin assembly 24 selected to receive the empty $CO_2$ gas cylinder 12 from the user.

Advantageously, the system 10 performs the additional steps of asking the user if they want a receipt of the transaction through the user interface 18. The transaction being the conclusion of the exchange of a $CO_2$ gas cylinder 12, the purchase of a new $CO_2$ gas cylinder or the return of a $CO_2$ gas cylinder. This may be done by generating indicia on a display, for example. On receipt of confirmation from the user through the interface 18, the system 10 generates a receipt for the transaction. The system 10 then performs the step of providing the receipt to the user. This is done by printing a physical copy of the receipt for the user through the user interface 18. Alternatively, the receipt is provided by e-mail to the user, where the user enters his or her e-mail address through the user interface 18.

As described herein, the system 10 can perform steps that allow the user to interact with the system 10 with minimal or no contact with the system 10 and/or a vending machine 14 embodying the system 10.

In particular, where step 102 of receiving user input is equivalent to step 108 of receiving an item in a first one of the bin assemblies 24, this may be user input representing a desire to exchange a $CO_2$ cylinder. The receipt of the item (and, in some embodiments, the confirmation that the item is a legitimate $CO_2$ cylinder at step 110) is followed by the receipt of payment from the user through the payment system 20 for a replacement $CO_2$ gas cylinder 12 at step 106. The payment is received through contactless means that do not require the user to touch the system 10 or the vending machine 14. For example, the payment can be received, via a contactless payment system as described hereinbelow. Following receipt of the relevant payment at step 106, at step 112 the system 10 causes locking system 28 to release a full $CO_2$ gas cylinder 12 located in a second one of the bin assemblies 24 for collection by the user.

Furthermore, the user input received at step 102 can be equivalent to step 116 of receiving payment from the user through the payment system 20 for a full $CO_2$ gas cylinder 12 without replacement. In other words, if the user input at step 102 consists of the user processing a payment using the payment system 2 (i.e., step 116), this is user input representing a desire to purchase a full $CO_2$ cylinder 12 without replacement. Following the receipt of the relevant payment at step 116, at step 118 the system 10 causes locking system

28 to release a full $CO_2$ gas cylinder 12 located in a second one of the bin assemblies 24 for collection by the user.

Additionally, the user input received at step 102 may be equivalent to receiving an item in one of the bin assemblies 24 (at step 122, and in some embodiments the confirmation that the item is a legitimate $CO_2$ cylinder at step 124) followed by an absence of payment through the payment system 20 (e.g., within a prescribed period of time). Such user input represents a desire to return an empty $CO_2$ gas cylinder 12 without replacement. The system 10 then causes the locking system to lock the received cylinder 23 in the bin assembly 24 at step 126. The system can also issue a credit to the user that is associated with the return of the $CO_2$ cylinder without replacement. The system 10 may issue the credit in accordance with at least one of the following methods:

(i) through payment system 20;
(ii) by displaying a barcode containing data representing a credit transaction on user interface 18, which the user can scan using a user device (e.g., user device 87 as described hereinbelow) to receive the credit; and
(iii) by printing a receipt (via a printer associated with the system 10) displaying a barcode containing data representing a credit transaction, which the user can scan using a user device to receive the credit.

The system 10 may display one or messages to the user to indicate the appropriate user input at step 102 to initiate an exchange, purchase or return of a $CO_2$ cylinder. In one embodiment, instructions are displayed on user interface 18 indicating that the user should: (1) insert a used $CO_2$ cylinder and process a payment through payment system 20 to initiate an exchange, (2) process a payment through payment system 20 to initiate a purchase of a full $CO_2$ cylinder, or (3) insert a used $CO_2$ cylinder and wait to initiate a return without replacement.

Thus, the user is able to avoid touching any part of the system 10 and/or vending machine 14 apart from any of: a $CO_2$ cylinder the user is returning, a full $CO_2$ cylinder 12 that the user is collects, and a receipt printed by the system 10.

Bin Assembly 24

Figure 4A:
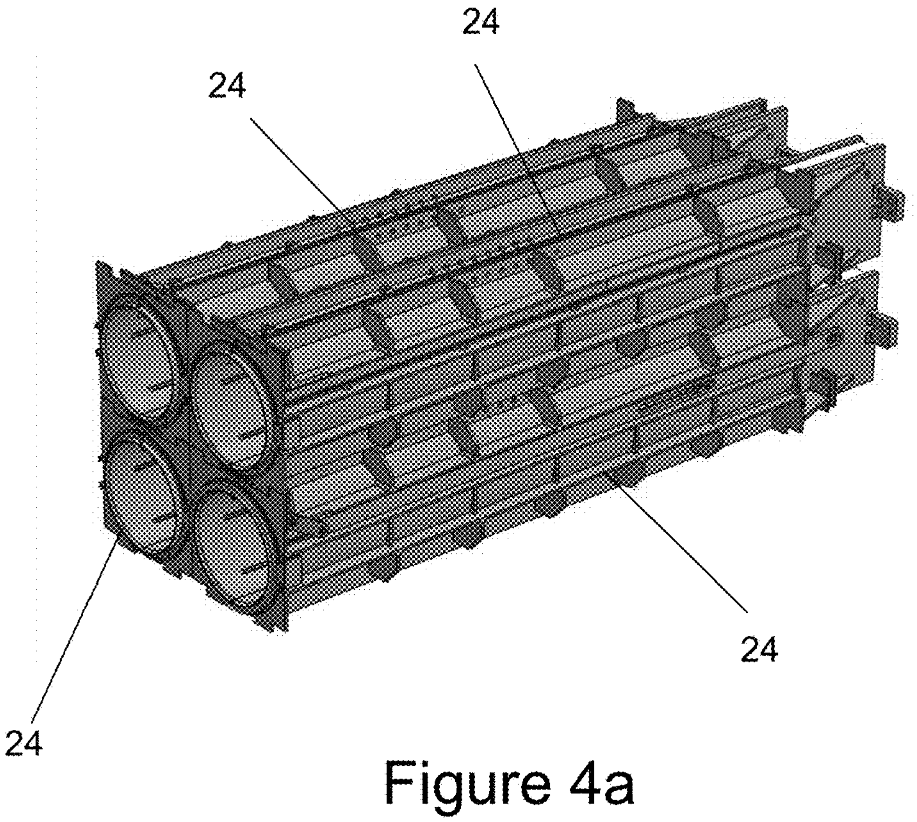
FIGS. 4*a* and 4*b* are perspective views of clusters of bin assemblies in different conditions of use.
Figure 4B:
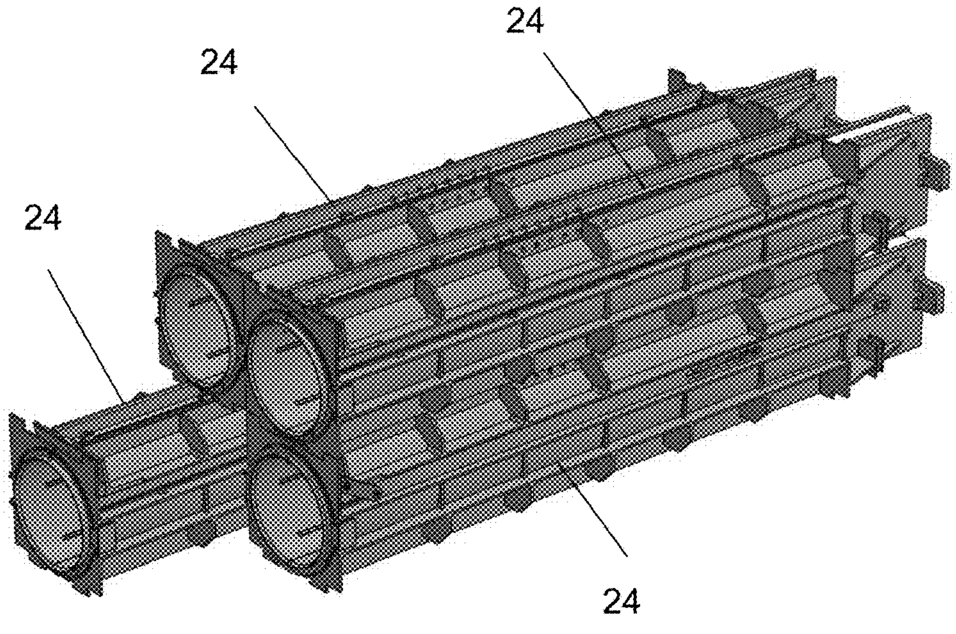
Figure 5A:
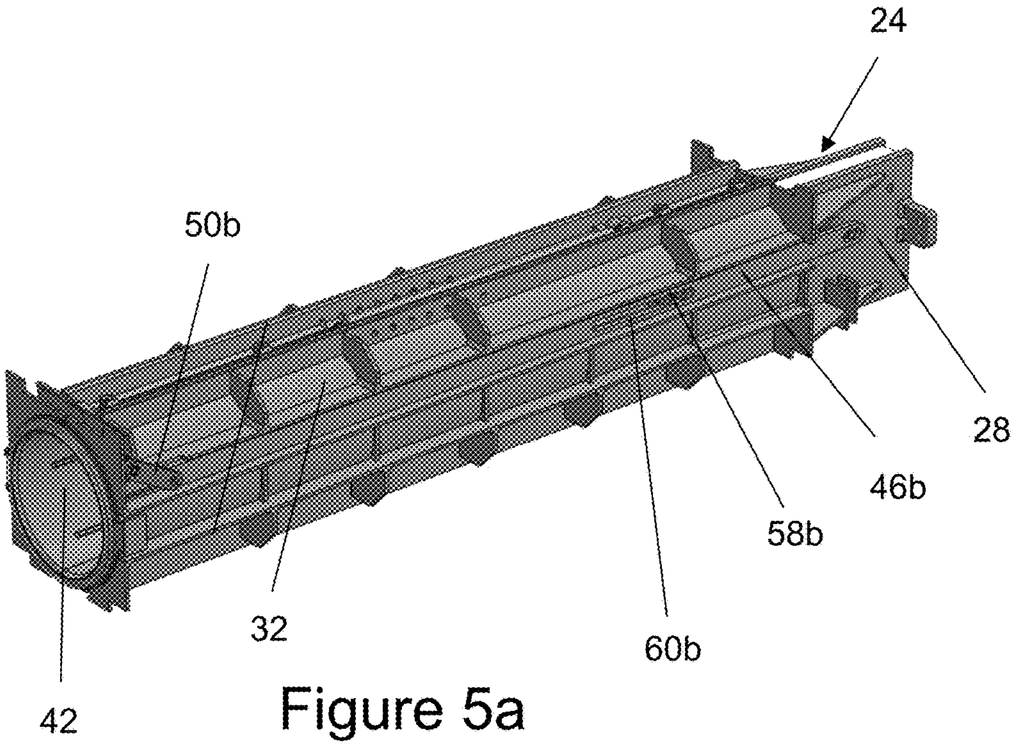
FIGS. 5*a* and 5*b* are perspective views of a bin assembly in different conditions of use.
Figure 5B:
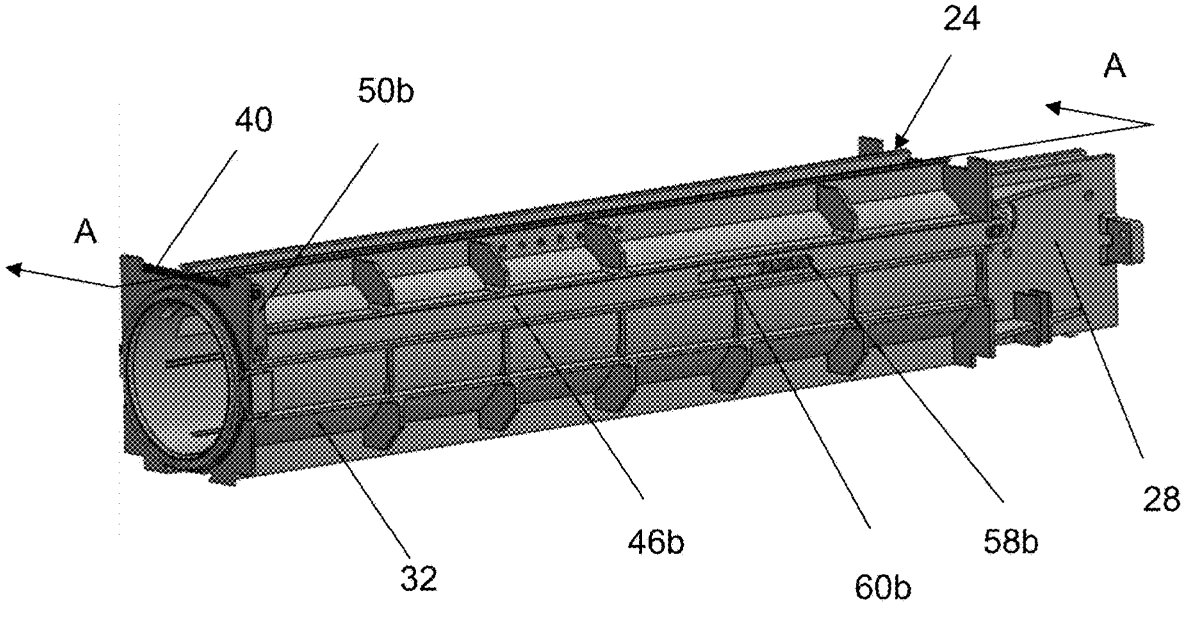

As shown in FIGS. 4*a* and 4*b*, the bin assemblies 24 have a modular structure that allows for easy connection and removal of individual bin assemblies 24 from the array 22. Individual bin assemblies 24 can be joined together in an array 22 of any size. Each individual bin assembly 24 can be slid out of the array 22 and replaced or serviced as needed.

With reference to FIGS. 5*a* to 8*b*, each bin assembly 24 in the array 22 includes a tubular chassis 32 with an open end 42 that is shaped to receive and seat therein a $CO_2$ gas cylinder 12. As shown, the tubular chassis 32 is formed in two parts which facilitates easy assembly. Alternatively, the tubular chassis 32 could be any other shape capable of receiving, and securing therein, an end section of a $CO_2$ gas cylinder 12. In some embodiments, the tubular chassis 32 is capable of receiving and securing therein either of two end sections on opposite ends of a $CO_2$ gas cylinder. In alternative embodiments, the tubular chassis 32 is capable of securing one end of the $CO_2$ gas cylinder only (referred to as a 'securable end'), and not another end (referred to as a 'non-securable end').

Figure 7:
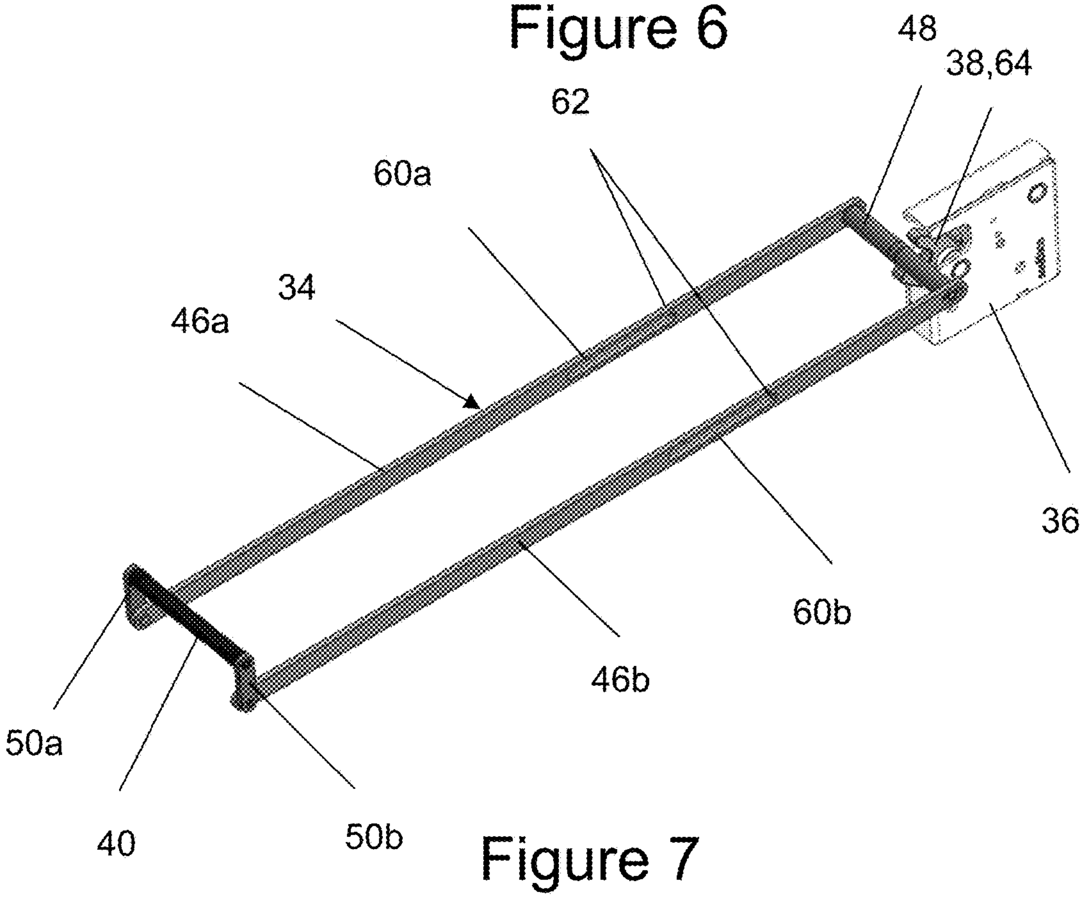
FIG. 7 is a perspective view of a sled of the bin assembly shown in FIG. 5*b*
Figure 8A:
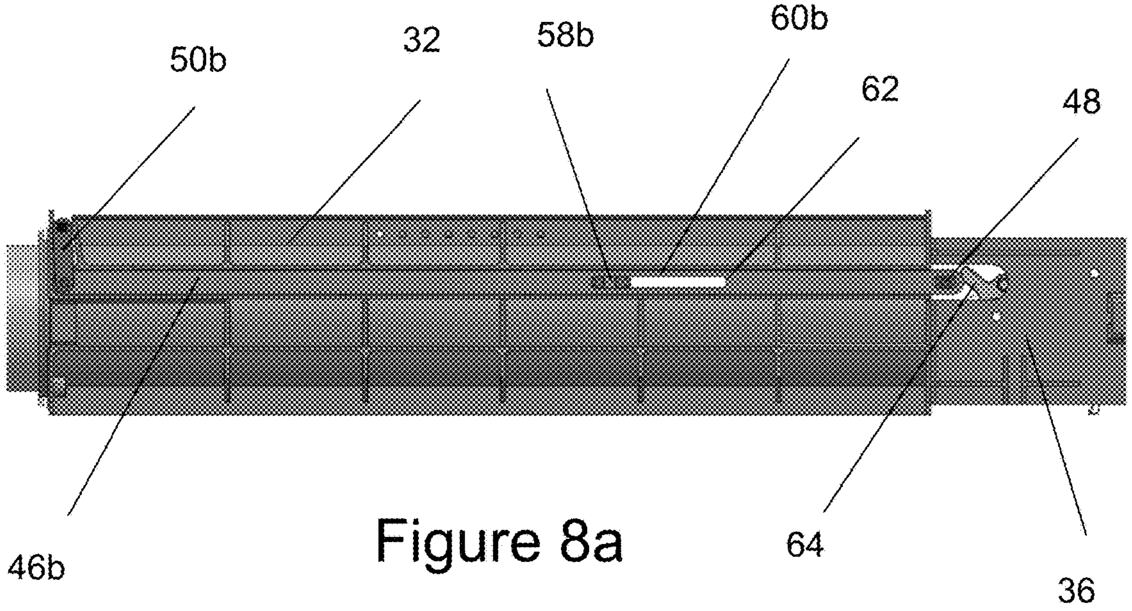
FIG. 8*a* is a side view of the bin assembly shown in FIG. 5*b* with a $CO_2$ gas cylinder partly inserted therein.
Figure 8B:
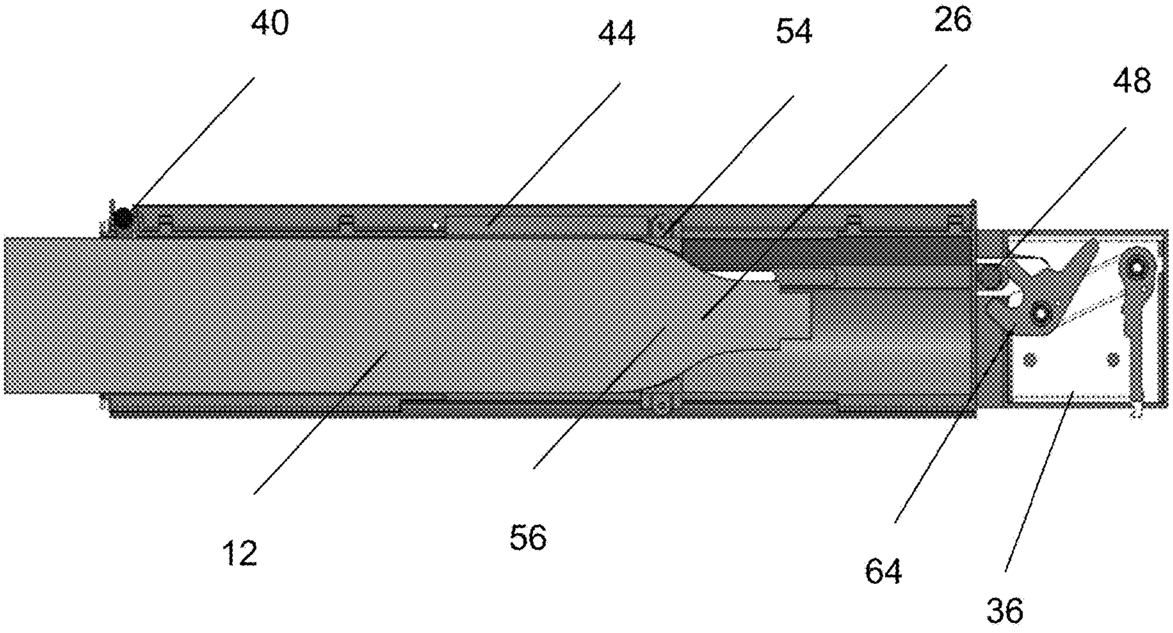
FIG. 8*b* is a section view of the bin assembly shown in FIG. 5*b* with a $CO_2$ gas cylinder partially inserted therein through the line A-A.

As particularly shown in FIG. 7, the locking system 28 of each bin assembly 24 in the array 22 includes a sled 34 that engages the $CO_2$ gas cylinder 12 as it is inserted in to the tubular chassis 32. The sled 34 is adapted to translate with respect to the tubular chassis 32 towards a locked position in the manner shown in FIGS. 9*a* to 9*c*. The sled 34 is in the locked position when the cylinder 12 is fully inserted into the chassis 32, as shown in FIG. 9*c*.

The locking system 28 of each bin assembly 24 also includes a rotary latch 36 that is engaged by the sled 34 as it translates towards the locked position. A latching arm 38 secures the sled 34 in the locked position.

Figure 9A:
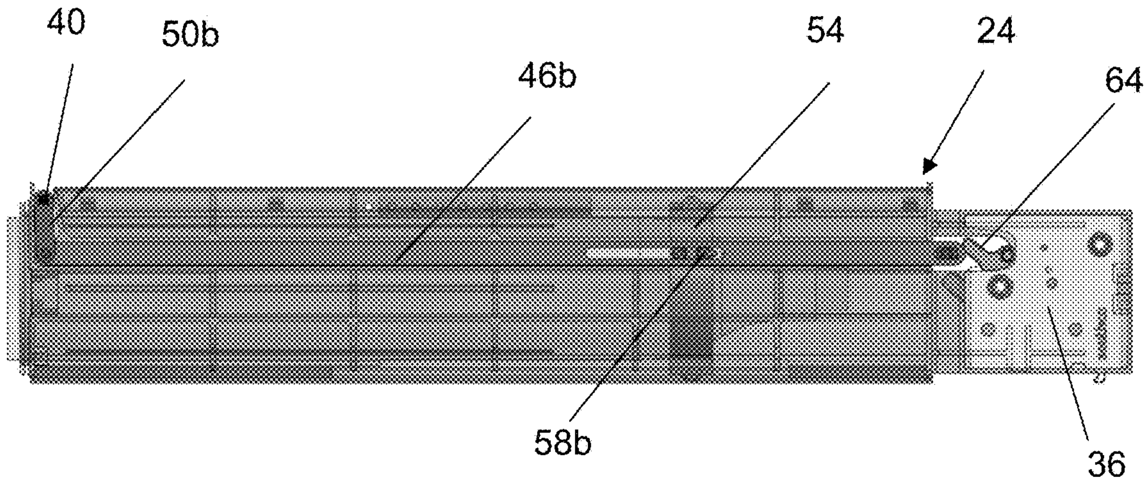
FIGS. 9*a* to 9*c* are partly transparent side views of the bin assembly shown in FIG. 5*b* in different conditions of use.
Figure 9B:
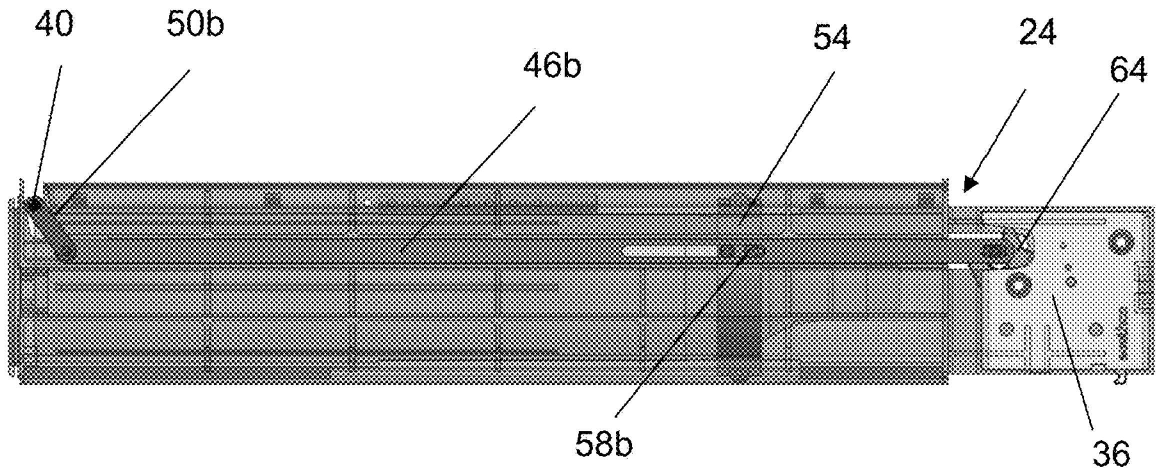
Figure 9C:
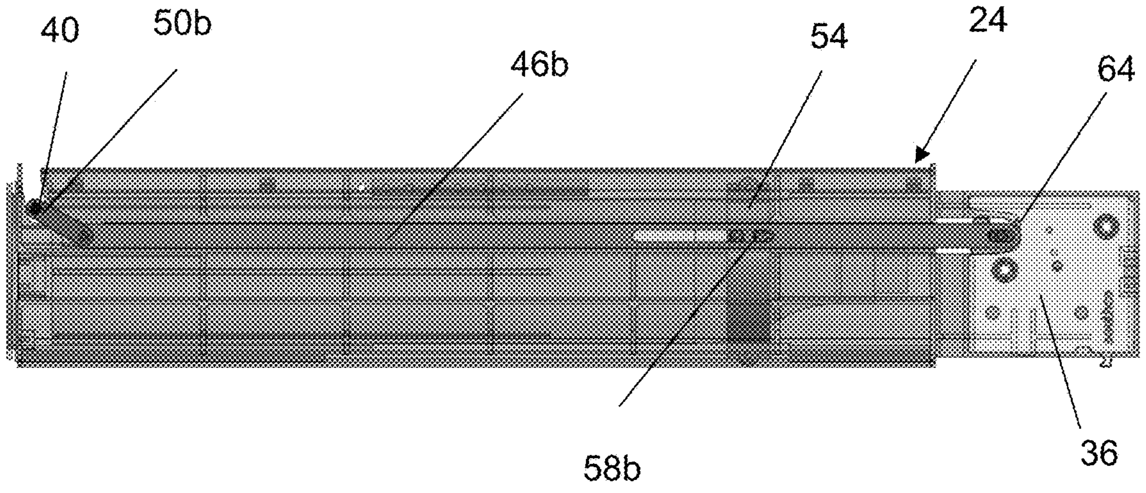
Figure 10:
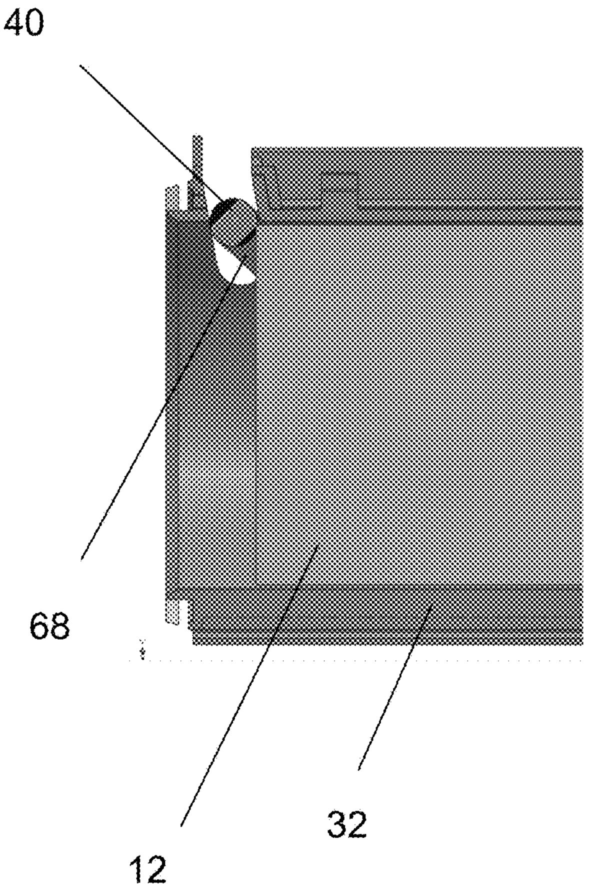
FIG. 10 is an enlarged view of the bin assembly shown in FIG. 8*b* in another condition of use.
Figure 11A:
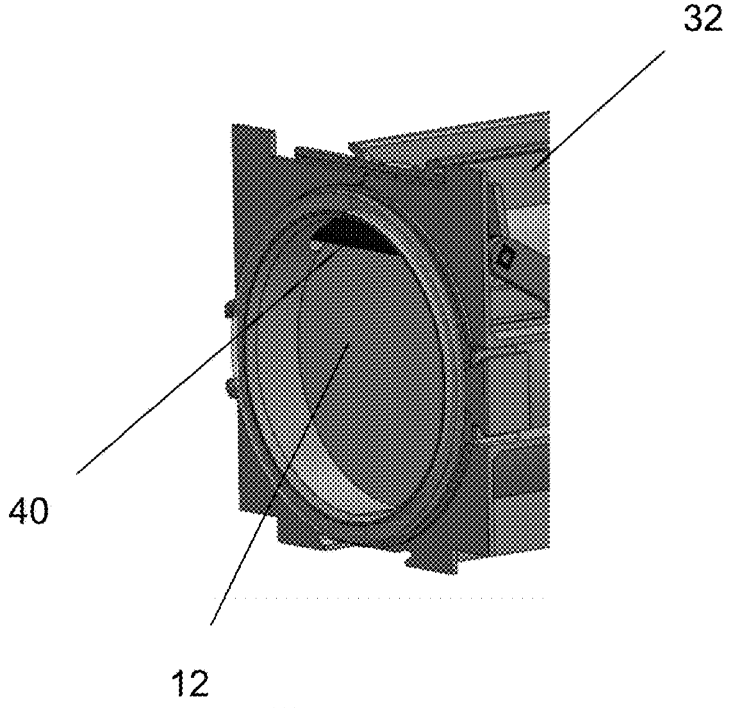
FIG. 11*a* is an enlarged end perspective view of the bin assembly shown in FIG. 5*a;*
Figure 12A:
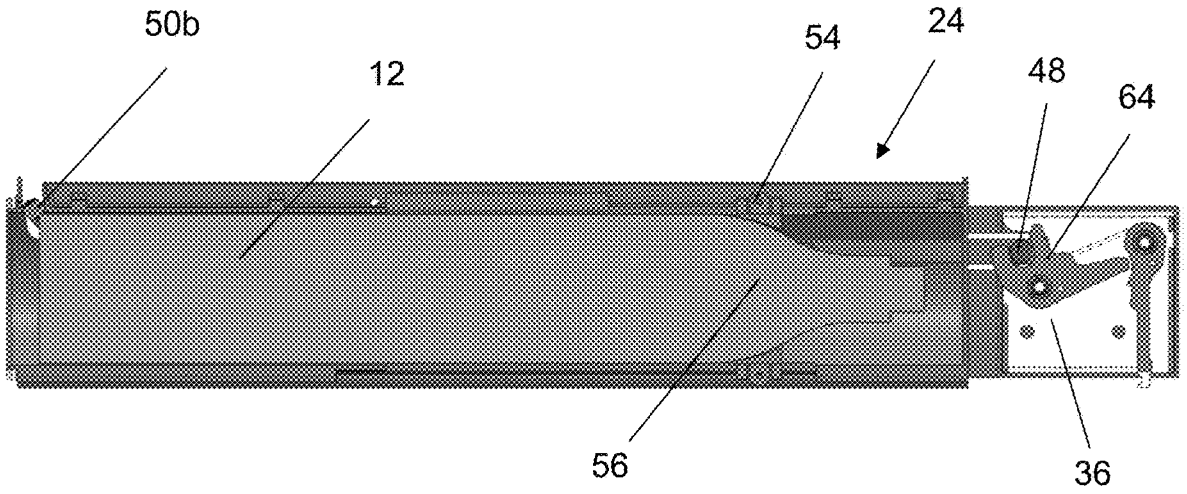
FIGS. 12*a* to 12*c* are section views through the line A-A of the bin assembly shown in FIG. 5*a* in different conditions of use.
Figure 12B:
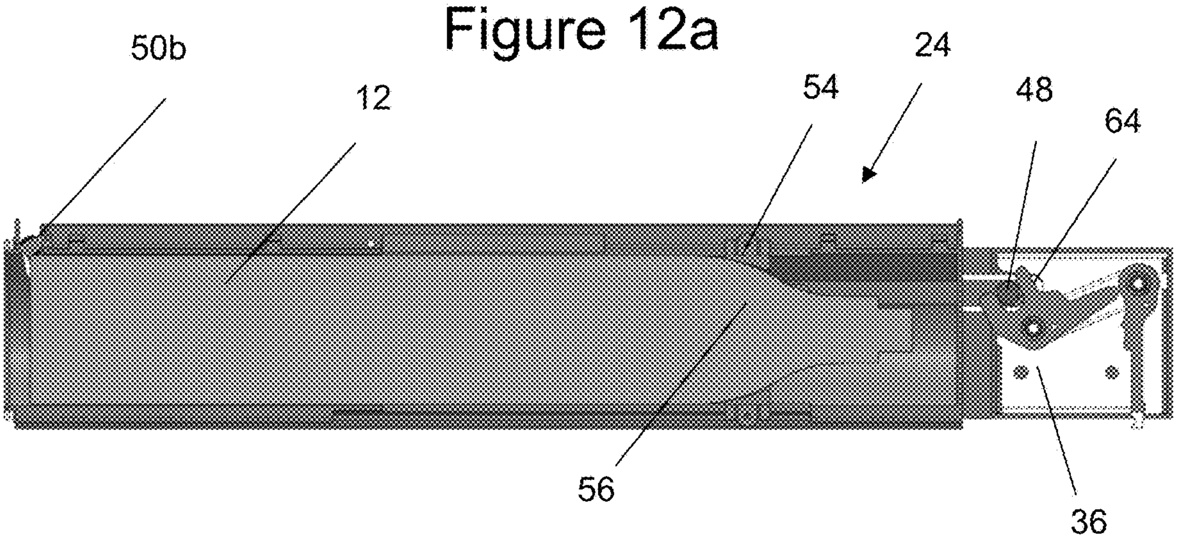
Figure 12C:
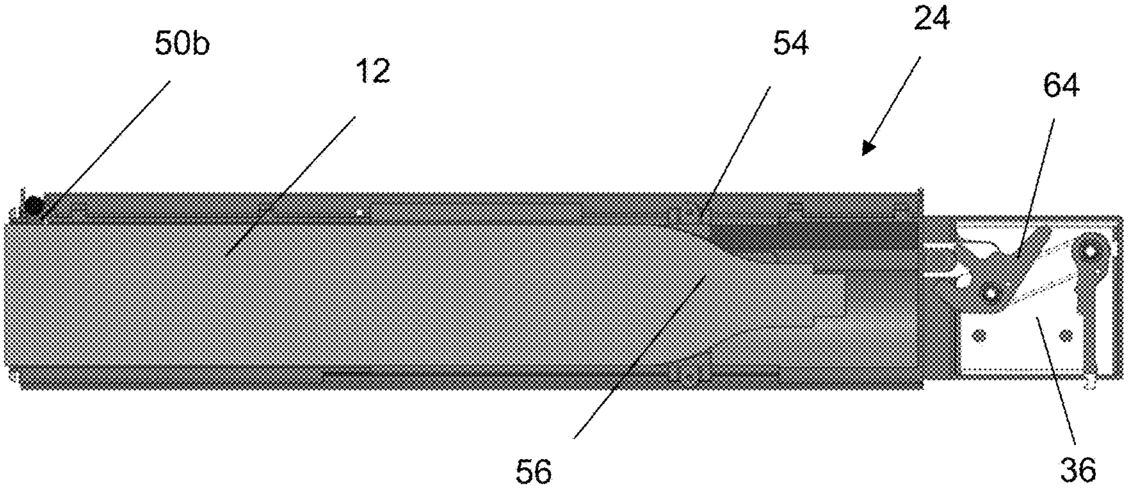

As shown in FIGS. 9*a* to 9*c*, translation of the sled 34 towards the locked position pulls a locking bar 40 at least partially over the open end 42 of the tubular chassis 32 so as to secure the $CO_2$ gas cylinder 12 therein.

The locking system 28 also includes a tension spring 44 that resiliently urges the sled 34 away from the locked position. The tension spring 44 acts to drive the sled 34 towards the open end 42 of the chassis 32 when the locking system 28 releases the $CO_2$ gas cylinder 12. This facilitates easy removal of the $CO_2$ gas cylinder 12 from the vending machine 14.

Figure 6:
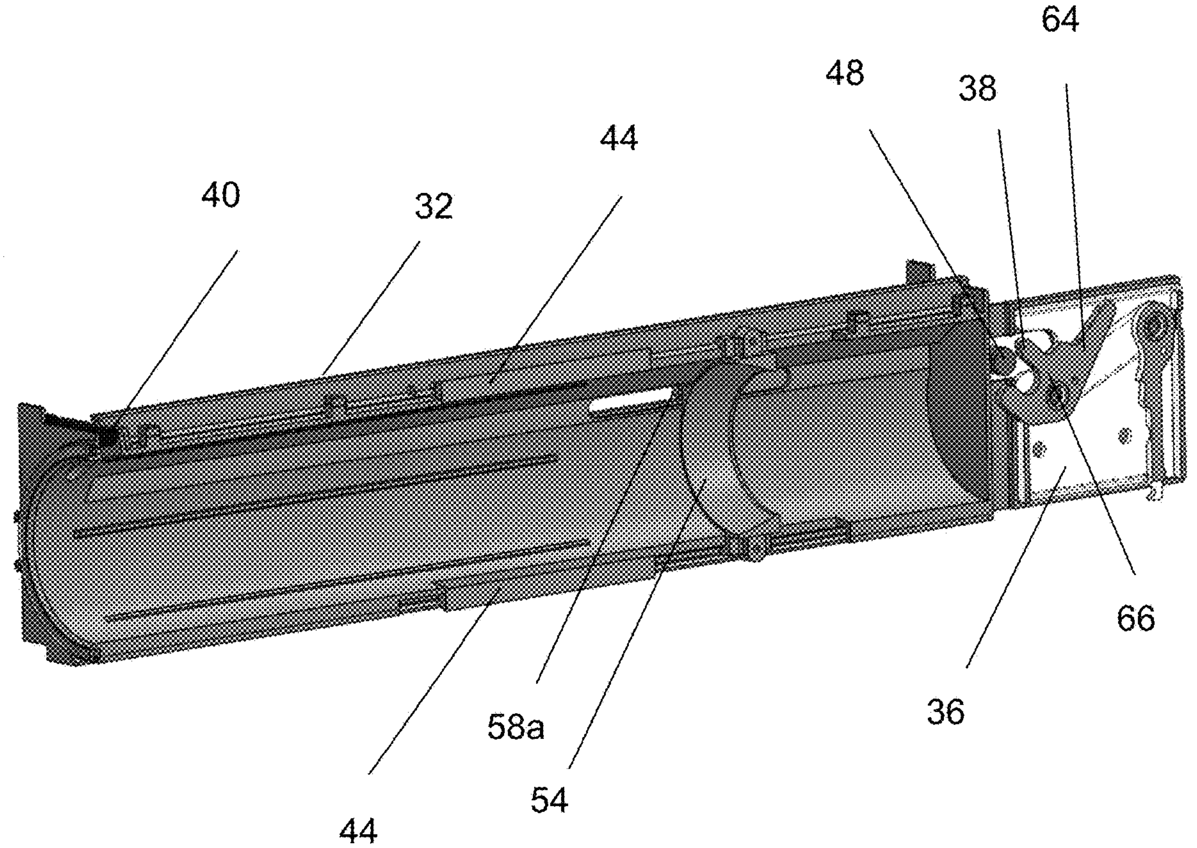
FIG. 6 is a section view of the bin assembly shown in FIG. 5*b* through the line A-A.

As shown in FIGS. 6 and 7, the sled includes:

(a) two parallel long linkage members 46*a*, 46*b* separated at a common end by a latching bar 48, the long linkage members extending along opposed sides of the tubular chassis 32;
(b) two parallel short linkage members 50*a*, 50*b* pivotally secured at a common end to respective other ends of the of the long linkage members 46*a*, 46*b;*
(c) a locking bar 40 coupled between other ends of the short linkage members 50*a*, 50*b*; and
(d) a collar 54 shaped to receive a necked section 56 of a $CO_2$ gas cylinder 12 when inserted into the tubular chassis 32.

The collar 54 includes pair of pins 58*a*, 58*b* that extend in opposite directions into respective slots 60*a*, 60*b* of the long linkage members 46*a*, 46*b*. The collar 54 is adapted to translate with respect to the long linkage members 46*a*, 46*b* along the length of the slots 60*a*, 60*b*.

When a $CO_2$ gas cylinder 12 is inserted into the tubular chassis 32, the necked section 56 of the cylinder 12 engages the collar 54 and the collar 54 is subsequently urged to translate along the slots 60*a*, 60*b* towards the latching bar 48 on the sled 34. Further, when the pins 58*a*, 58*b* of the collar 54 abut terminal end sections 62 of the slots 60*a*, 60*b*, the cylinder 12 drives the sled 34 another 20 mm, for example, towards the rotary latch 36, and the latching bar 48 engages an actuator arm 64 of the rotary latch 36 and urges it towards a locked position.

The double action of latching and locking of the locking system 28 secures the $CO_2$ gas cylinder 12 in the vending machine 14. Although the locking system 28 has been above described in terms of the sled 34 translating through the chassis 32 and latching to the rotary latch 36 and pulling down of the locking bar 40, other methods for releasably securing the $CO_2$ gas cylinders 12 in the vending machine 14 are anticipated. For example, the $CO_2$ gas cylinders 12 may be secured in the vending machine 14 by the locking system 28 from one end of the $CO_2$ gas cylinder 12 only (the securable end). Alternatively, $CO_2$ gas cylinders 12 may be secured in the vending machine 14 by the locking system 28 from either end.

The authentication system 30 includes:

(a) a latching sensor 66 for detecting the state of the rotary latch 36; and
(b) a locking sensor 68 for determining the state of the locking bar 40.

The latching sensor 66 and the locking sensor 68 confirm that an item inserted into the tubular chassis 32 is a legitimate $CO_2$ gas cylinder 12 when the sled 34 is in the locked position and the locking bar 40 at least partially overlies the open end 42 of the tubular chassis 32 so as to block removal of the cylinder 12.

Figure 15:
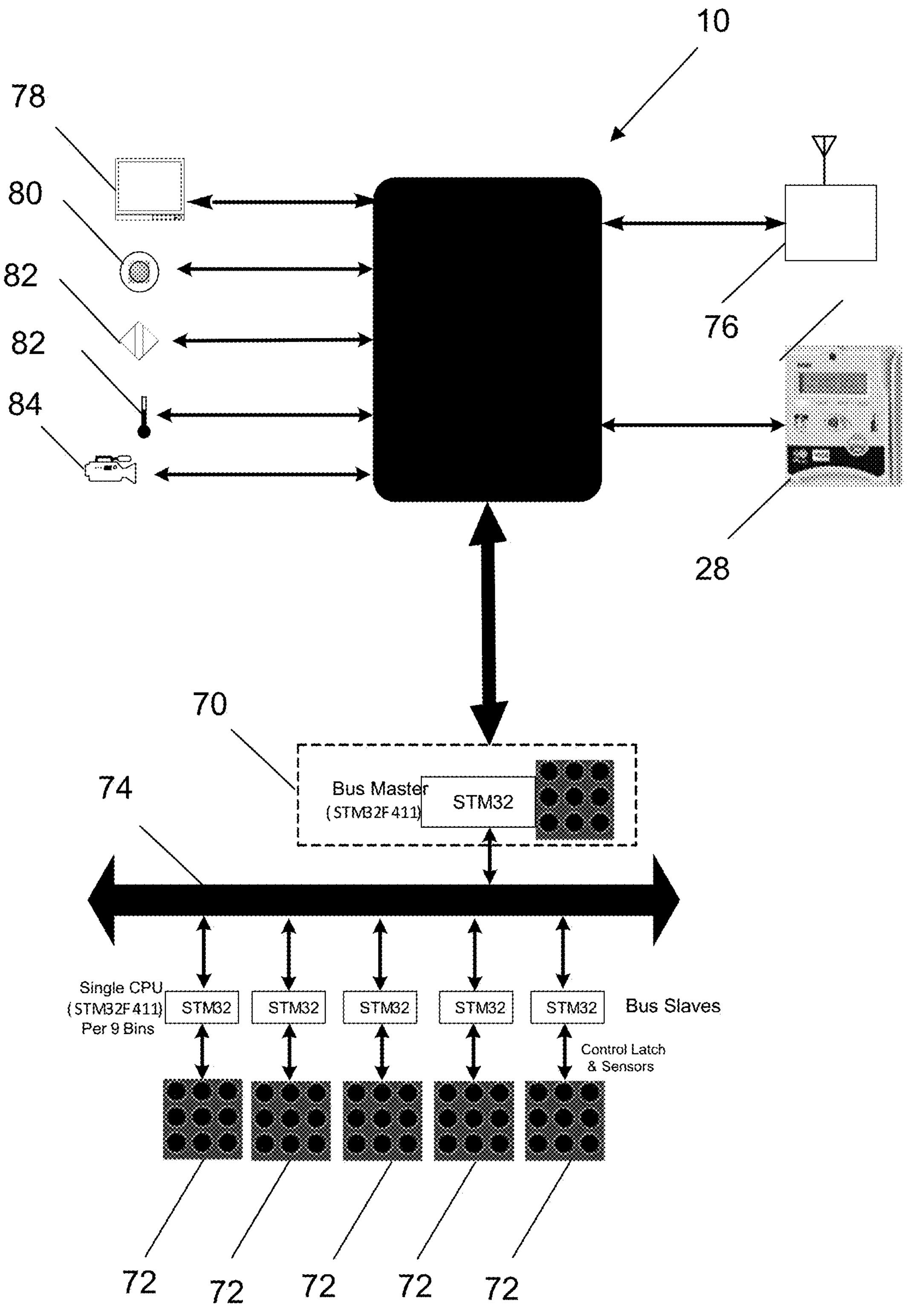
FIG. 15 is a schematic diagram showing component parts of the system shown in FIG. 1.

As shown in FIG. 15, the authentication system 30 alternatively, or in addition, includes one or more of the sensors 82 in communication with the controller 16 by way of a $I^2C$ interface or a GPIO, for example:

(a) eddy current sensors;
(b) Hall effect sensors;
(c) micro switches;
(d) weight sensors;
(e) bar code readers; and/or
(f) image sensor.

These sensors act to confirm that the item inserted into the chassis 22 is a legitimate $CO_2$ gas cylinder 12.

In one embodiment, the array 22 of bin assemblies 24 is made up of a plurality of clusters 72 of sub-arrays of bin assemblies. For example, each cluster includes nine bin assemblies 24. The clusters 72 are modular and can be separately removed from the array 22 for repair, for example.

Figure 14A:
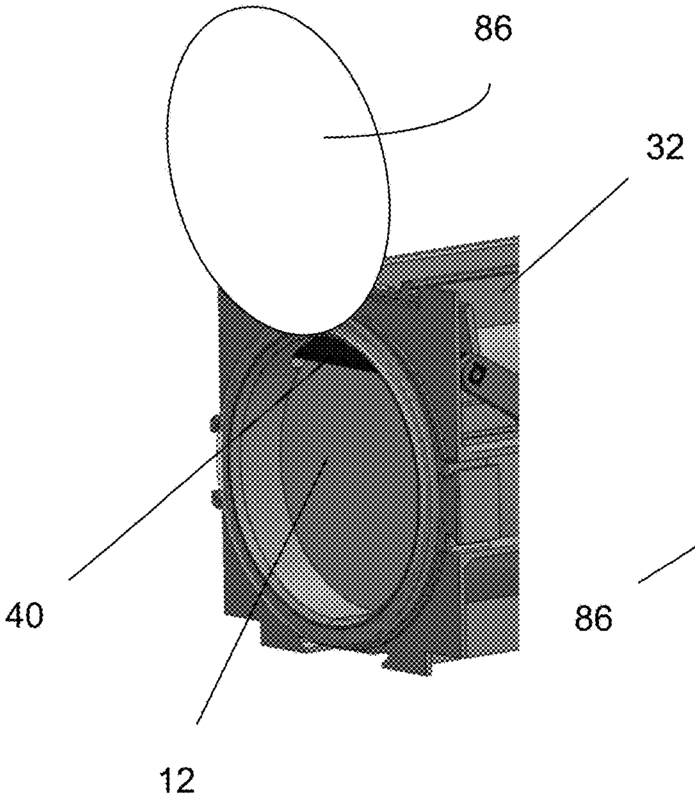
FIGS. 14*a* & 14*b* are enlarged end perspective views of an alternative bin assembly in different conditions of use.
Figure 14B:
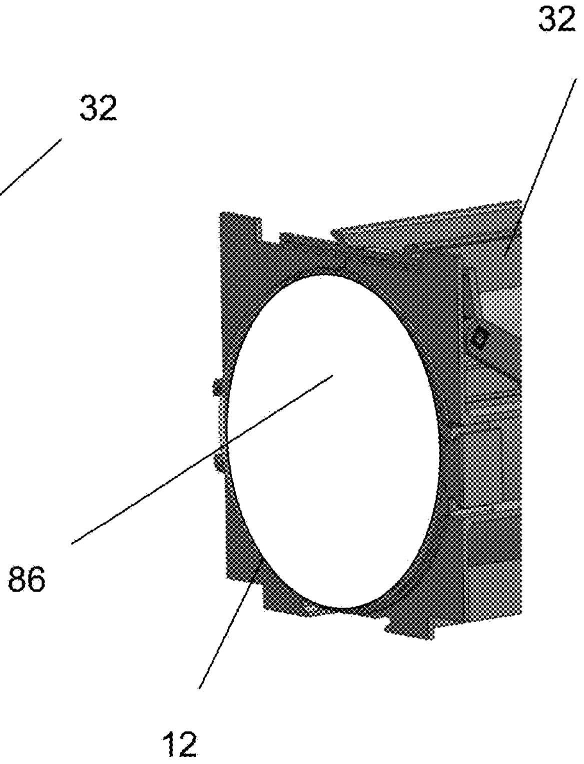

In the embodiment shown in FIGS. 14*a* and 14*b*, each bin assembly 24 includes a door 86 that is operable between open and closed conditions of use. In the closed condition of use, the door 86 overlies the open end 42 of the tubular chassis 32 and inhibits ingress of external elements into the bin assembly 24. For example, the door 86 inhibits entry of rain and dust into the bin assembly 24 when in the closed position. The door is preferably IP66 rated or similar.

When arranged in the open condition of use, the door 86 allows full access to the tubular chassis 32 to facilitate insertion and removal of $CO_2$ gas cylinders 12 into/from the machine 14.

Each bin assembly 24 includes an actuator (not shown) that drives the door 86 between the open and closed conditions of use. The actuator is in communication with the controller 16 which governs its operation.

Advantageously, the locking system 28 includes use of the door 86 to secure a $CO_2$ gas cylinder in a tubular chassis 32 of a bin assembly.

Figure 13:
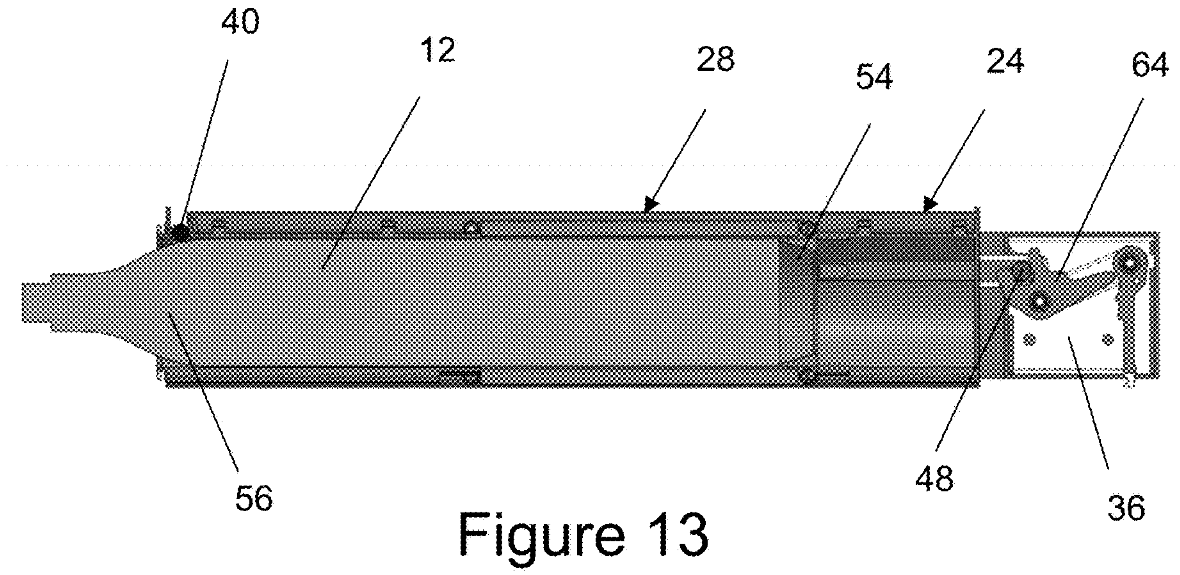
FIG. 13 is a section views through the line A-A of the bin assembly shown in FIG. 5*b* in different conditions of use.

As shown in FIG. 13, if a user inserts the cylinder 12 the wrong way, the locking system 28 will not be able to lock the cylinder 12 in the chassis 32 and the process will abort.

Alternatively, the user interface 18 is a contactless user interface 85. Advantageously, the contactless user interface 85 is a hands free interface that operates from voice commands or hand gestures.

Figure 16:
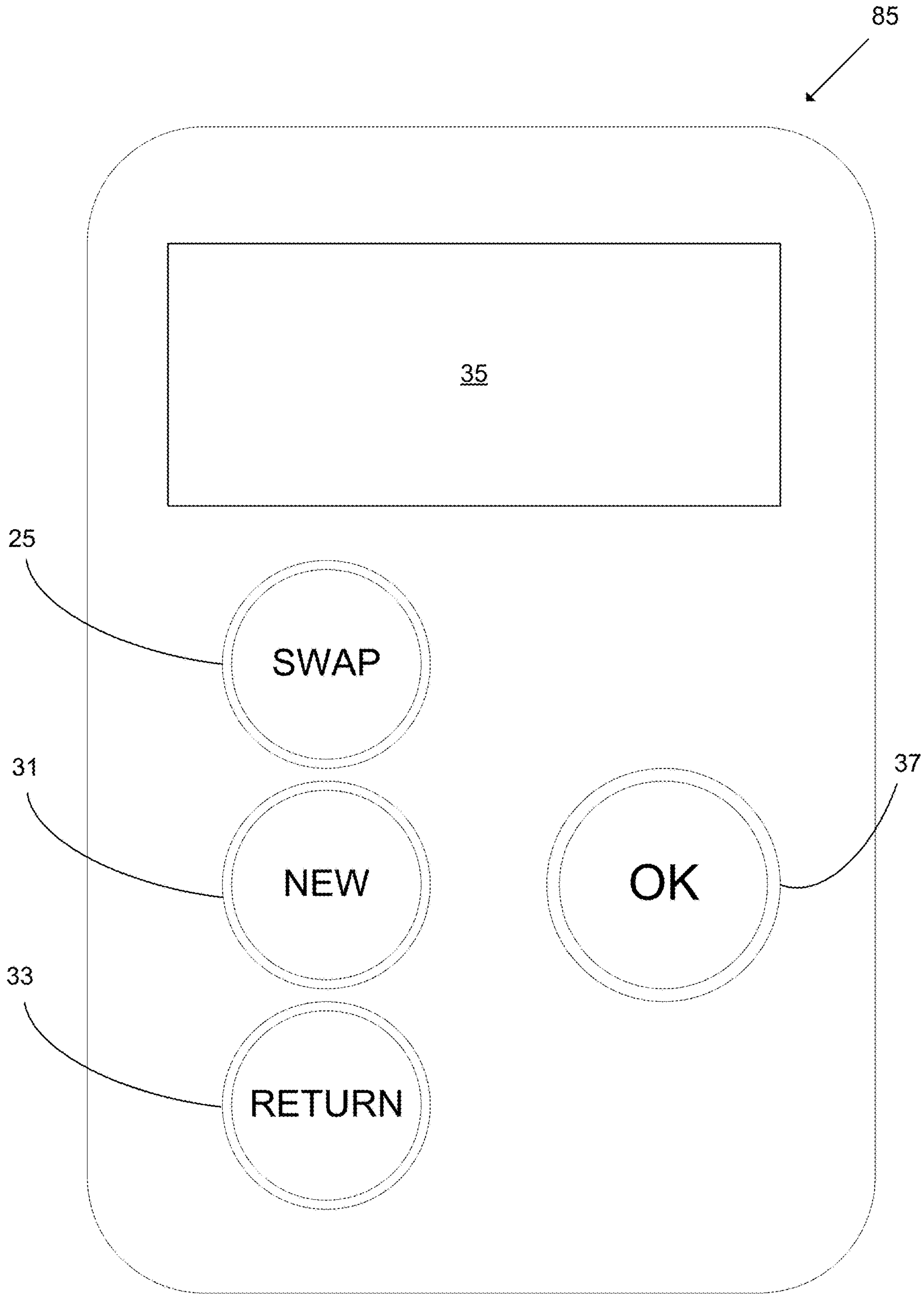
FIG. 16 is a diagram of a contactless user interface with sensor buttons.

The contactless user interface 85 may include at least one sensor button. FIG. 16 shows an embodiment in which the contactless user interface 85 has a display 35 and four sensor buttons, being:

(i) the "Swap" function button 25 that is used to represent a desire to exchange a $CO_2$ gas cylinder 12;
(ii) the "New" function button 31 that is used to represent a desire to purchase a full $CO_2$ gas cylinder 12 without replacement; and
(iii) a "Return" function button 33 that is used to represent a desire to return an empty $CO_2$ gas cylinder 12 without replacement;
(iv) a "Confirm" or "OK" button 37 that is used to confirm that an activated button reflects the user's desired operation of the vending machine system 10 (e.g., to allow a user to correct an erroneous activation of a sensor button).

Each sensor button is activated by a user without requiring the user to come into physical contact with the button or any other part of the vending machine system 10. For example, each sensor button may be an infrared sensor button that is activated by a user holding a portion of their hand over the button in close proximity. However, each sensor button can also be any other kind of suitable sensor that can be activated by the user without touching it. Each of the sensor buttons can include a visual indicator to indicate to the user that it has been activated, such as an LED light on or around the button.

The contactless user interface 85 may include a proximity sensor 86 for sensing when a user has approached the vending machine system 10. The proximity sensor 86 detects the presence of a user in the vicinity of the vending machine system 10, and may only detect the presence of a user within a particular radius of the vending machine system 10. The proximity sensor 86 may include, for example, one or more of the following:

(i) an optical sensor such as an infrared sensor;
(ii) an acoustic sensor such as an ultrasonic sensor;
(iii) a camera or video camera; and
(iv) a microwave sensor.

The controller 16 is configured to switch the vending machine system 10 from a low power mode to a normal operation mode when the proximity sensor 86 senses that a user has approached the system 10. Therefore, if the proximity sensor 86 detects that a user has approached the vending machine system 10, e.g., because it detects an object within a threshold vicinity of the vending machine system 10, the controller 16 switches the vending machine system 10 out of the low power mode into the normal operation mode so that the user can interact with the vending machine system 10, e.g., to return, purchase and/or exchange a $CO_2$ gas cylinder 12. After a transaction with the user has been completed, the controller 16 automatically switches the vending machine system 10 back into the low power mode in order to reduce its power consumption. In the low power mode, some features of the vending machine system 10 such as the authentication system 30 and the payment system 20 may be disabled.

The contactless user interface 85 may include a speech recognition system configured to receive a user voice command via the microphone 93 and determine whether the user voice command corresponds to a user input representing a desire to either exchange, purchase or return a $CO_2$ gas cylinder 12.

Figure 17:
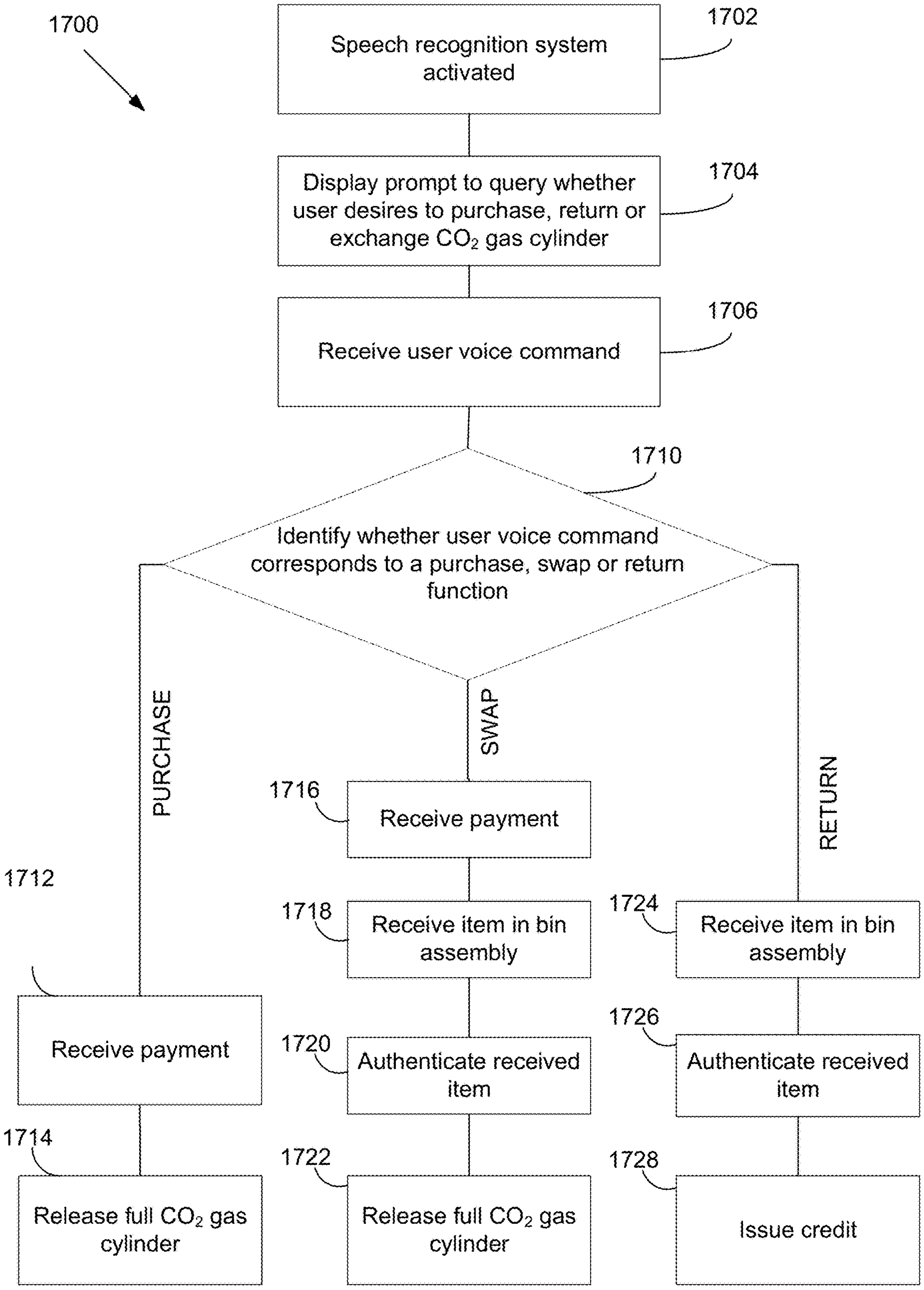
FIG. 17 is a flow diagram of receiving user input using a contactless user interface and a speech recognition system.

As shown in FIG. 17, the contactless user interface 85 may perform a method 1700 including the following steps:

(i) activate the speech recognition system (step 1702);
(ii) display a prompt to query the user's intention, i.e., when the user desires to purchase, return or exchange a $CO_2$ gas cylinder 12 (step 1704);
(iii) receive a user voice command (step 1706);
(iv) identify a function corresponding to the user voice command (step 1710);
(v) if the user voice command corresponds to a purchase function:
  a. receive payment from the user through the payment system 20 (step 1712); and
  b. release a full $CO_2$ gas cylinder from one of the bin assemblies 24 (step 1714)
(vi) if the user voice command corresponds to a swap function:
  a. receive payment from the user through the payment system 20 (step 1716);
  b. receive an item in one of the bin assemblies 24 (step 1718);
  c. authenticate the received item (step 1720); and d. release a full $CO_2$ gas cylinder from one of the bin assemblies 24 (step 1720).

(vii) if the user voice command corresponds to a return function:

a. receive an item in one of the bin assemblies 24 (step 1724);

b. authenticate the received item (step 1726); and c. issue a credit to the user through the payment system 20 (step 1728).

The speech recognition system is activated at step 1702. The controller 16 may activate the speech recognition system, e.g., based on the proximity detector 86 sensing that a user has approached the vending machine system 10, or based on an item being received in one of the bin assemblies 24. Therefore, the steps may occur in more than one order—for example by the step of receiving an item in the bin assembly 24 (step 1718 or 1724) occurring prior or simultaneously to the speech recognition system being activated (step 1702).

Figure 18:
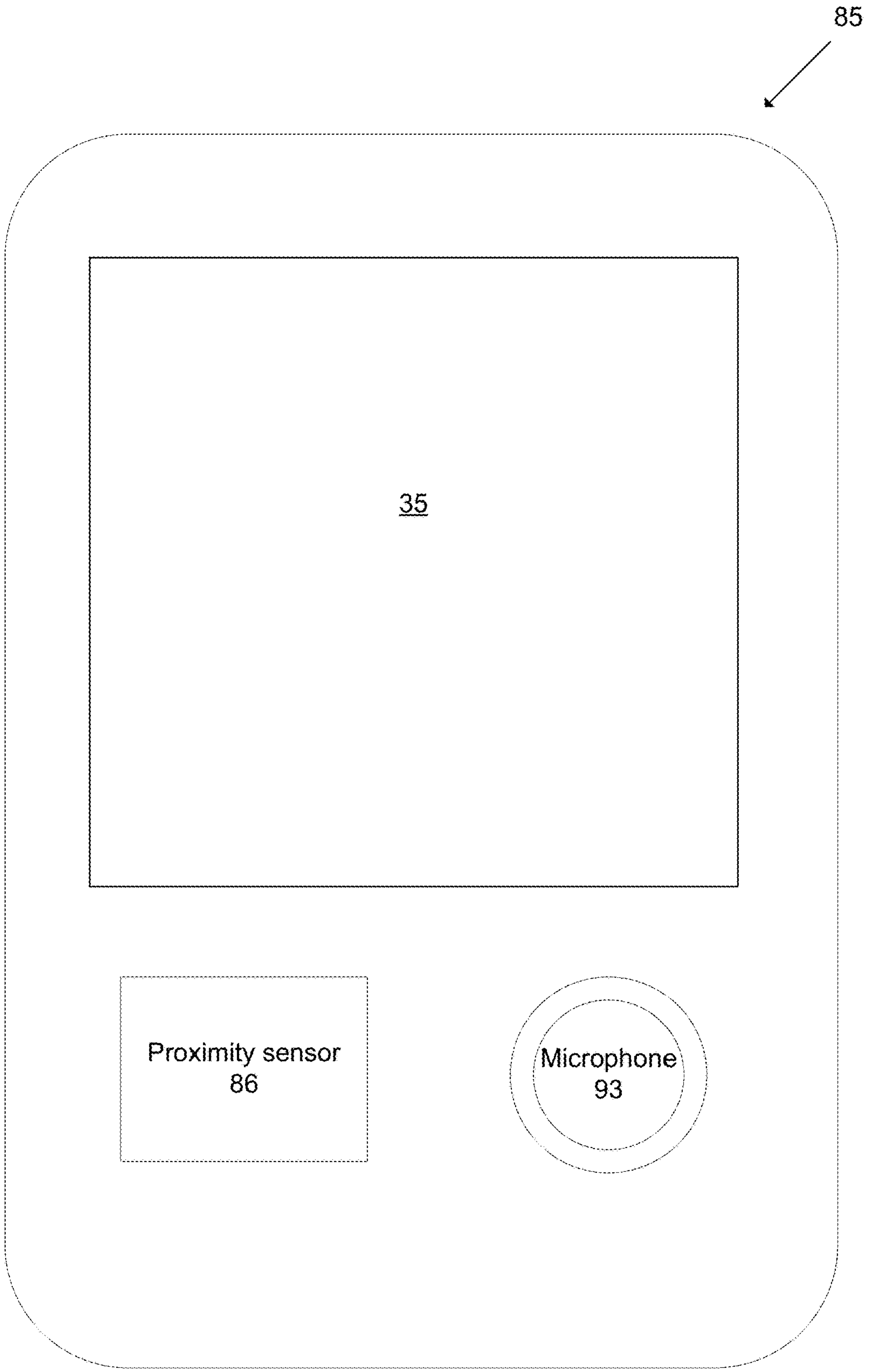
FIG. 18 is a diagram of a contactless user interface for use with a speech recognition system.

As shown in FIG. 18, the contactless user interface 85 may include a display 35, the proximity sensor 86 and a microphone 93. The display may render prompts and other messages to be displayed to the user, e.g., at step 1704 of method 1700.

Advantageously, the instead of a rotary latch 36, the bin assemblies 24 include a worm drive.

Controller 16

In the example shown in FIG. 15, the system 10 includes:

(a) a controller 16 includes a Raspberry Pi 4 Model B 2 GB that includes:

(i) 1.5 GHz quad-core ARM Cortex-A72 CPU (ii) VideoCore VI graphics (iii) 4kp60 HEVC decode (iv) True Gigabit Ethernet (v) 2.4 GHz and 5.0 GHz IEEE 802.11ac wireless, Bluetooth 5.0, BLE (vi) 2×USB 3.0 and 2×USB 2.0 ports (vii) 2×micro-HDMI ports (1×4kp60 or 2×4kp30)

(viii) USB-C for input power, supporting 5.1V 3A operation (ix) LPDDR4 RAM 4GB

The controller 16 is in communication with the bin assemblies 24 by way of the a Bus Master. This would normally be the closest set of 9 bins to the Controller 16.

The protocol between the Controller 16 and the Bus Master 70 supports the ability to communicate via RS485 Bus 74 which can send and receive data from each individual Bin assembly 24 back through the Bus Master 70 to the controller 16.

The system 10 supports the ability for remote updating of both Firmware and Applications, where required.

As shown in FIG. 15, the user interface 18 includes a touch screen 78 and touchless sensors 80 that are configured to interface with the controller 16 through respective USB and GPIO interfaces.

The controller 16 is preferably in communication with a facial recognition system 84 by way of a MIPI/DSI interface.

The controller 16 is preferably a control module including a central processing unit. For example, the controller 16 includes a Broadcom BCM2711 or similar and the CPU for cluster of nine bins 24 will be a STM32F411 or similar. The central processing unit is in communication with non-transient data storage that include instructions stored there on that engage the system components to perform the steps 100 shown in FIG. 3.

Alternatively, the controller 16 includes a plurality of central processing units each in communication with non-transient data storage that include instructions stored there on that engage the system components to perform the steps 100 shown in FIG. 3.

Further, the controller can include a field programmable gate array that has been configured to engage the system components to perform the steps 100 shown in FIG. 3.

Payment System 20

As shown in FIG. 2, the payment system 20 includes a payment terminal in communication with the controller 16 via a USB port or a TTL UART. The payment system 20 uses standard systems for effecting point of sale transactions.

The payment system 20 may be configured to receive payment in the form of a cryptocurrency (referred to as a 'crypto-payment').

The payment system 20 may be a contactless payment system, such that the user does not have to come into physical contact with the payment system 20 (or the vending machine system 10) in order to execute a payment for a new or replacement $CO_2$ gas cylinder 12, or a credit for return of a $CO_2$ gas cylinder 12. For example, the contactless payment system may be configured to receive payment from the user via a contactless payment platform such as Mastercard's Paypass™ platform.

Vending Machine 14

As shown in FIG. 2, the vending machine 14 has an open front to allow entry and exit of $CO_2$ gas cylinders. The vending machine 14 preferably provides the following advantages:

The location of the cylinders 12 is known at any time—both empty and full

The transactions occur in real time

Data on each exchange is recorded by the machine, including customer info, for later use which can help to determine behavioural patterns (when customers are likely to complete a transaction and demographics The vending machine 14 is adapted to send realtime information back to a central server, reporting on stock levels and the condition of the machine.

The vending machine is adapted to receive information from the central server that can be used to control the operation of the machine, including the price real-time (anytime)—option for different prices in different locations Camera in vending machine (face recognition)—complete a transaction with customers consent Face recognition to determine height of person which allows the machine to eject a cylinder or request insertion of cylinder based on that person's height (wheelchair as example)

Confirmation of person standing in front of vending machine (vending machine issuing random number, person keys into mobile to confirm they are physically there)

Figure 21A:
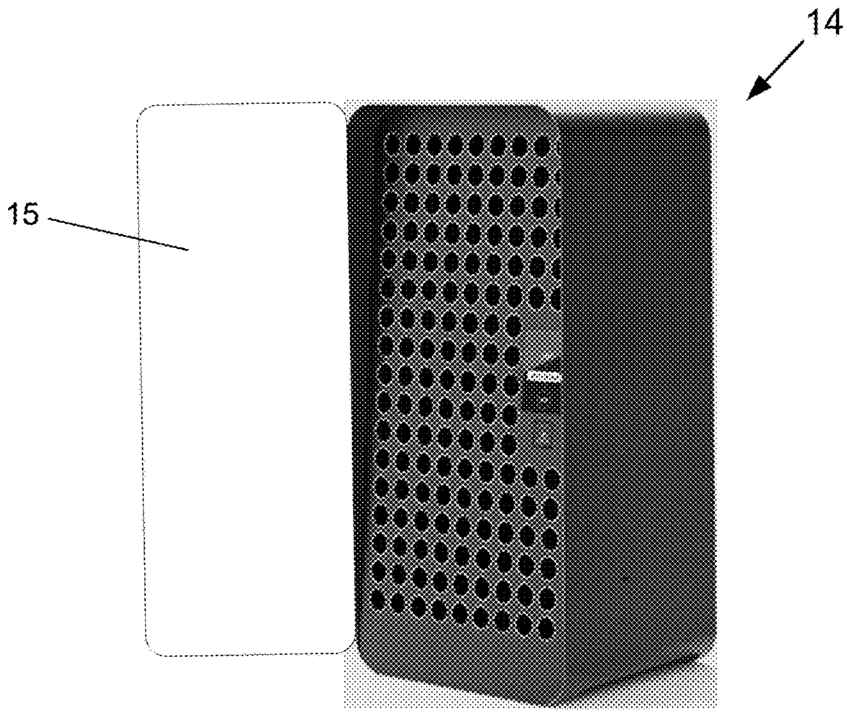
FIGS. 21A & 21B are perspective views of the vending machine shown in FIG. 2 fitted with a door.
Figure 21B:
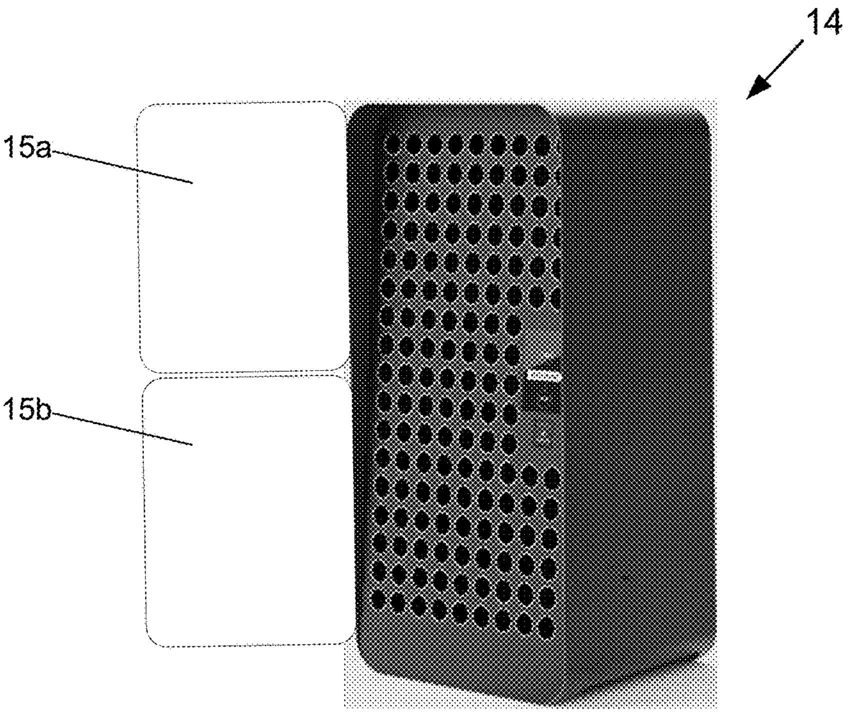

User credits can be in the form of gift cards, or a credit to a bank account or credit/debit card Loyalty Card Alternatively, the vending machine 14 includes one or more main doors 15 to safe guard the array 22 of bin assemblies 24 from ingress of contaminants (such as dust and water), as shown in FIGS. 21A and 21B. Each main door 15 has an Ingress Protection rating of IP66. Each main door 15 is hinged to allow access to the bin assemblies 24. Each main door 15 is biased so as to default closed position covering the bin assemblies 24.

Each main door 15 preferably includes a lock (not shown). This may protect the array 22 of bin assemblies 24, and the $CO_2$ cylinders from exposure to the elements (e.g., by the door blowing open) as well as from tampering or other deliberate damage. The system 10 communicates with the lock to release the door 15 when the system receives appropriate user input. For example, the system 10 unlocks the main door 15 after it has received payment through payment system 20 for purchase or exchange of a $CO_2$ cylinder 12. After the user has appropriately inserted and/or retrieved the $CO_2$ cylinder 12 (as indicated by their user input), the system 10 locks the main door 15. The system 10 advantageously includes an actuator (not shown) that operates to open and close the door based on a communication sent from the controller 16. The system 10 may automatically open and close the door 15 so that the user does not have to touch the door to access the array 22 of bin assemblies 24 to insert or retrieve a $CO_2$ cylinder. The system 10 may lock/unlock main door 15 by the controller 16. The system 10 may automatically open and close main door 15 by the controller 16.

FIG. 21B shows an embodiment of vending machine 14 that has two main doors: high main door 15*a* and low main door 15*b*. In accordance with this embodiment, the system 10 unlocks one of the high main door 15*a* and the low main door 15*b* based on one or both of:

(i) one or more bin assemblies 24 available to receive a used $CO_2$ cylinder inserted by the user; and (ii) a bin assembly 24 that has released a full $CO_2$ cylinder for the user to retrieve.

Alternatively, the system 10 unlocks both of the doors 15*a* and 15*b*, e.g., so that the user can choose which bin assembly 24 in the array 22 to insert the used $CO_2$ cylinder.

Remote Control of Vending Machine System 10

Figure 19:
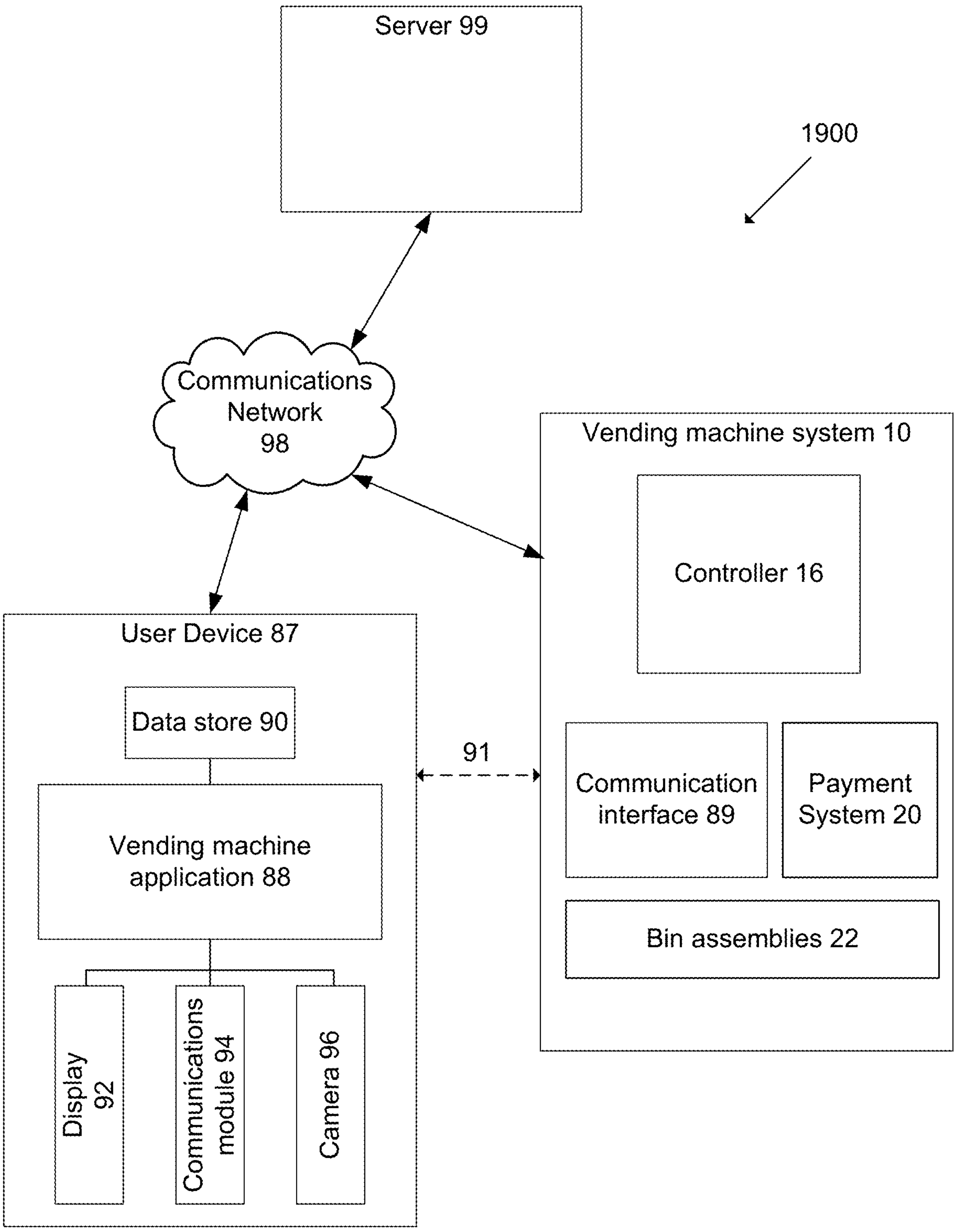
FIG. 19 is a schematic diagram of a system for controlling a vending machine.

The system 1900 shown in FIG. 19 is used for remotely controlling a vending machine system 10 for $CO_2$ gas cylinders 12 using a user device 87. As described hereinabove, the vending machine system 10 includes controller 16, payment system 20, bin assemblies 22. The vending machine system may also include a communication interface 89 for exchanging data via communications network 89 and/or wireless communications link 91.

The user device 87 includes a vending machine application 88, data store 90, display 92, communication module 94 and camera 96. User device may be a mobile phone, tablet device, laptop computer or any other suitable computing device.

The system 1900 performs a method for remotely controlling a $CO_2$ gas cylinder vending machine system, including steps of:

(1) displaying a remote vending machine user interface 200 on display 92 of the user device 87;

(2) receiving on the user device 87 user input indicating a desire to engage with the vending machine system 10 to perform at least one of the following operations:

(a) return a $CO_2$ cylinder 12;

(b) purchase a $CO_2$ cylinder 12; or (c) exchange a $CO_2$ cylinder 12;

(3) transmitting the user input over communications network 98 to a communications interface 89 of the vending machine system 10;

(4) receiving the user input at the communication interface 89 of the vending machine system 10; and (5) controlling the vending machine system 10, by controller 16, based on the received user input.

A vending machine application 88 is executed on user device 87 to provide functionality to the user via the remote vending machine user interface 200, displayed to the user on display 92.

Vending machine application 88 is a specialised software application that enables communication between the user device 87 and one or more servers and/or other devices over communications network 98. The application 88 may be a native application on the user device that has access to the communications network 98, which may be downloadable from a mobile software distribution platform. However, application 88 can also be a web application (or 'web app') that is accessed through a web browser on the user device 87 by downloading one or more webpages hosted by a server 99.

The vending machine application 88 may require the user to login with their user account details, e.g., with an account username and password, so that any operation of the vending machine system 10 and corresponding transactions can be tracked and stored to data store 90, and later transmitted to server 99 to be stored in a server data store again the user's account details.

The user device 87, operable by the user, is in communication with server 99 via communications network 98. Vending machine system 10 may also be connected to communications network 98, and therefore the user device 87 and the vending machine system 10 may be able to communicate with each other over communications network 98.

The communications network 98 can be a local or wide area network, or a combination of the plurality of different local or wide area some networks. The user device 87 includes a communications module 94 configured to exchange data over the communications network 98. The server 99 receives requests from the user device 87 in relation to operating a particular vending machine system 10. The server 99 processes the requests and communicates with the vending machine system 10 to accordingly perform relevant operations.

Alternatively or additionally, the user device 87 may directly communicate with the vending machine system 10 via wireless communications link 91. The wireless communication link 91 uses a standard communication protocol such as: Bluetooth, BLE, Wi-Fi or Near-Field Communication (NFC). Wireless communications link 91 is formed between the communications module 94 of the user device 87 and the communication interface 89 of the vending machine system 10.

Figure 20:
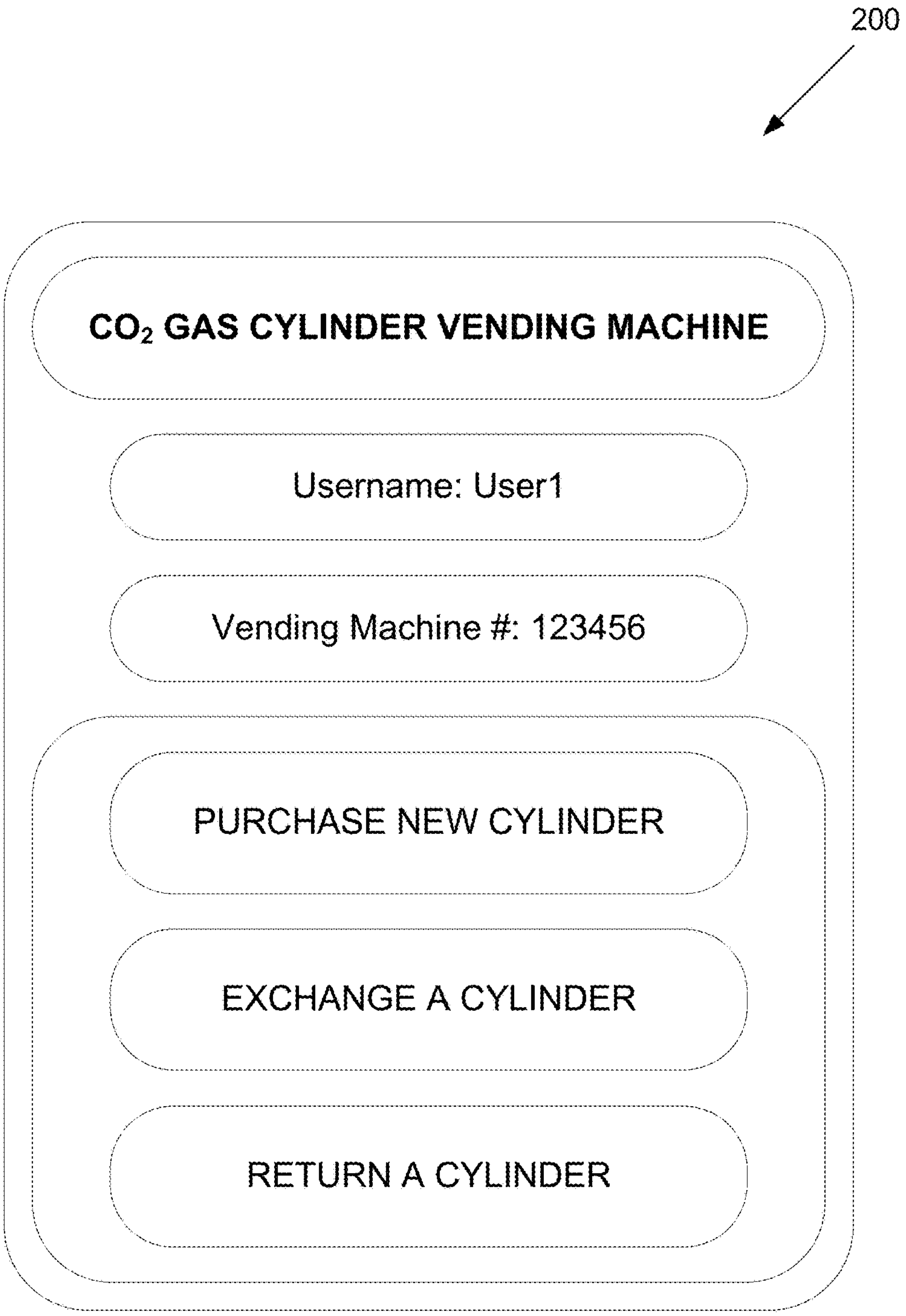
FIG. 20 is an exemplary remote vending machine user interface.

FIG. 20 shows an exemplary remote vending machine user interface 200 which may be displayed by the user device 87 on display 92. The remote vending machine user interface 200 is configured so that when displayed on display 92, the user is able interact with the user interface 200 so as to use the vending machine application 88 to select one or more options to operate the vending machine system 10, e.g., the "purchase", "exchange" and/or "return" functions as described hereinabove. The user may interact with the user interface 200 via, for example, a touch sensitive display, a stylus, a microphone of the user device 87 or one or more controls of the user device (e.g., mechanical buttons).

The communications module 94 of the user device 87 receives a remote vending machine user interface 200 from the vending machine system 10. The remote vending machine user interface 200 allows the user to exercise user input relating to their desired operation of the vending machine system 10 on the user device 87, rather than the user interface 18 of the vending machine system 10. In this way, the user can avoid touching or coming into close proximity with a surface of the user interface 18 which may have been touched by previous users of the vending machine system 10. The remote vending machine user interface 200 may be unique to vending machine system 10, i.e., each of a plurality of vending machine systems 10 corresponds to a unique remote vending machine user interface.

The remote vending machine user interface 200 is transmitted by the communication interface 89 of the vending machine system 10, and received by the communications module 94 of the user device 87 via at least one of the following:

(a) the communications network 98; and (b) a wireless communications link with the communications interface 89 of the vending machine system 10.

The remote vending machine user interface 200 may only be transmitted by the communication interface 89 if the user device 87 is within a certain proximity of the vending machine system 10. This ensures that the vending machine application 88 does not receive any user input relating to a particular vending machine system 10 when the user is not within a certain proximity of the system 10 such that they user is likely to actually interact with the system 10 (e.g., to purchase, exchange or return a $CO_2$ gas cylinder).

The method may include the user device 87 performing the following steps:

(i) scanning, by the camera 96 of the user device 87, indicia uniquely identifying the vending machine system 10, wherein the indicia encodes a Uniform Resource Locator (URL) associated with the vending machine system 10;

(ii) decoding the scanned indicia and retrieving the URL;

(iii) sending a request to the server 99 based on the URL via the communications network 98; and (iv) receiving, via a response from the server 99, the remote vending machine user interface 200 for the vending machine system 10.

The method may include the server 99 performing steps of:

(i) receiving the request based on the URL from the user device 87;

(ii) sending, in a response, the remote vending machine user interface 200 to the user device 87 via the communications network 98.

The indicia uniquely identifying the vending machine system 10 is a barcode such as a 2D barcode, e.g., a Quick-Response (QR) code. The indicia is located on a vending machine 14 that includes vending machine system 10 such that it is accessible to be scanned by the user using the camera 96 of the user device 87. The indicia encodes a URL to which a web request can be sent by the communications module 94 of the user device 87 to server 99 located at that URL. The URL may be associated with and thereby give the user access to the vending machine application 88 where it is a web application. Alternatively, the URL may be associated with a web resource, which when requested by the user device 87, allows the user device 87 to receive the remote vending machine user interface 200 for the vending machine system 10 (e.g., for use with a native application).

The user device 87 decodes the scanned indicia by executing instructions stored in data store 90, such as instructions associated with stored barcode or QR code reading software. The user device 87 may alternatively transmit an image of the indicia to the server 99, which decodes the indicia and sends a response containing the URL back to the user device 87.

The user device 87 transmits a request to the vending machine system 10 to use the vending machine system 10. The request may be made in response to user input indicating such a request on the user device 87. The vending machine system 10 receives the request from the user device 87 to use the vending machine system 10. The request is received at the communication interface 89, and may be communicated over communications network 98 or wireless communications link 91.

Upon receiving the request, the vending machine system 10:

(i) determines, based on the request, a proximity of the user device 87 to the vending machine system 10;

(ii) determines, based on the determined proximity, whether the user device 87 is within a proximity threshold distance to the vending machine system; and (iii) if the user device is within the proximity threshold distance, controlling the vending machine system by the controller based on further user input.

The proximity threshold is, for example, two meters. Alternatively, the proximity threshold is any suitable range that a user can functionally interact with the system 10.

In one embodiment, the step of determining a proximity of the user device 87 is effected by the system 10 completing a handshake with the user device 87. For example, the system 10 generates:

(a) a number on the vending machine screen 78 and prompts the user to enter the number into the displayed number into the device 87; and/or (b) scan a QR code; and/or (c) an SMS with a number that is sent to a number that is keyed into the vending machine by the user.

The vending machine system 10 may determine the proximity of the user device 87 based on location data included in the request.

Therefore, any further user input by the user on the user device 87 will not prompt the vending machine system 10 to perform further steps unless the user is within the proximity threshold distance. This may prevent users from erroneously attempting to interact with a vending machine system 10 that is not close by (e.g., another vending machine system in a different location that the user has previously interacted with), as well as users who deliberately attempt to interfere with the vending machine system 10 for illegitimate purposes (e.g., to prevent legitimate users from interacting with the system 10).

The vending machine application 88 may also be capable of processing payments which are then communicated to the payment system 20 of the vending machine system 10 (e.g., over communications network 98). The user device 87 performs steps of:

(i) receiving user input corresponding to a payment; and (ii) transmitting a notification of the payment to the communications interface 89 of the vending machine system 10, while the vending machine system 10 performs steps of:

(i) receiving the notification of the payment at the communications interface 89 of the vending machine system 10; and (ii) communicating, by the controller 16, to payment system 20 of the vending machine system 10 that the payment has been received.

The notification of the payment may be transmitted to the communications interface 89 of the vending machine system 10 via communications network 98 or wireless communications link 91. Once the controller has communicated to payment system 20 that the payment has been received, the payment system 20 recognises that a payment has been processed and accordingly may allow a $CO_2$ gas cylinder 12 to be received in one of the bin assemblies 24 and/or release a full $CO_2$ gas cylinder 12 for collection by the user.

As used herein, an element recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF PARTS

10 Vending machine system
12 $CO_2$ gas cylinder
14 Vending Machine
15 Main door
**15*a*** High main door
**15*b*** Low main door
16 Controller
18 User interface
20 Payment system
22 Array of bin assemblies
24 Bin assembly
25 Swap function button
26 End of $CO_2$ gas cylinder
28 Locking system
30 Authentication system
31 New function button
32 Tubular chassis
33 Return function button
34 Sled
35 Display
36 Rotary latch
37 Confirm/OK function button
38 Latching arm
40 Locking bar
42 Open end of the chassis
44 Tension spring
**46*a*, 46*b*** Long linkage member
48 Latching bar
**50*a*, 50*b*** Short linkage member
54 Collar
56 Necked section
**58*a*, 58*b*** Pin
**60*a*, 60*b*** Slot
62 Terminal end section
64 Actuator arm
66 Latching sensor
68 Locking sensor
70 Bus Master
72 Cluster
74 RS485 Bus
76 4G/5G interface
78 Touch screen
80 Touchless sensors
82 Sensors
84 Facial recognition system
85 Contactless user interface
86 Proximity sensor
87 User device
88 Vending machine application
89 Communication interface
90 Data store
91 Wireless communications link
92 Display
93 Microphone
94 Communications module
96 Camera
98 Communications network
99 Server
200 Remote vending machine user interface

What is claimed is:

1. A method for remotely controlling a $CO_2$ gas cylinder vending machine system, including a controller in communication with a user interface, a payment system and an array of bin assemblies, wherein each one of the bin assemblies is shaped to at least partially receive an end of a $CO_2$ gas cylinder and includes a locking system for releasably securing therein a $CO_2$ gas cylinder, the method including:

receiving user input at a communication interface of the vending machine system;

controlling the vending machine system, by a controller, based on the received user input, wherein the user input is conducted on a user device, and indicates a desire to engage with the vending machine system to perform at least one of the following operations:

(a) return a $CO_2$ cylinder;

(b) purchase a $CO_2$ cylinder; or (c) exchange a $CO_2$ cylinder;

wherein the communication interface of the vending machine system transmits the remote vending machine user interface to the user device via at least one of the following:

(a) communications network; and (b) a wireless communications link with a communications module of the user device, further including:

receiving a request from the user device to use the vending machine system;

determining, based on the request, a proximity of the user device to the vending machine system;

determining, based on the determined proximity, whether the user device is within a proximity threshold distance to the vending machine system; and the controller only controlling the vending machine system based on the received user input if the user device is within the proximity threshold distance;

wherein each bin assembly in the array includes a tubular chassis shaped to receive and seat therein a $CO_2$ gas cylinder;

wherein the locking system of each bin assembly in the array includes a sled that engages the $CO_2$ gas cylinder as it is inserted into the tubular chassis, the sled translating in the same direction as the inserted cylinder and with respect to the tubular chassis towards a locked position; and wherein the locking system of each bin assembly in the array includes a rotary latch that is engaged by the sled, the cylinder driving the sled towards the rotary latch into the locked position, and wherein a latching arm of the rotary latch secures the sled in the locked position.

2. The method of claim 1, further including transmitting, from the communication interface, the remote vending machine user interface to the user device.

3. The method of claim 1, further including:

receiving a notification of a payment at the communication interface of the vending machine system;

communicating, by the controller, to a payment system of the vending machine system that the payment has been received.

4. The method of claim 3, said system for performing the steps of:

(1) receiving user input through the user interface; and (2) at least one of the following:

(a) if the user input represents a desire to exchange a $CO_2$ gas cylinder, then the system performs the steps of:

(i) receiving payment from the user through the payment system for a replacement $CO_2$ gas cylinder;

(ii) receiving a $CO_2$ gas cylinder in a first one of said bin assemblies; and (iii) the locking system releasing a full $CO_2$ gas cylinder located in a second one of said bin assemblies for collection by the user, (b) if said user input represents a desire to purchase a full $CO_2$ gas cylinder without replacement, then the system performs the steps of:

(i) receiving payment from the user through the payment system for a full $CO_2$ gas cylinder without replacement; and (ii) the locking system releasing a full $CO_2$ gas cylinder located in a third one of said bin assemblies for collection by the user, and (c) if said user input represents a desire to return an empty $CO_2$ gas cylinder without replacement, then the system performs the steps of:

(i) receiving the $CO_2$ gas cylinder in one of said bin assemblies;

(ii) the locking system locking the $CO_2$ gas cylinder in said one of said bin assemblies; and (iii) issuing a credit to the user through the payment system for return of $CO_2$ gas cylinder without replacement.

5. The method claimed in claim 4, wherein, when step (c) is performed, the step of issuing the credit to the user alternatively comprises issuing the credit to a charitable organization.

6. The method of claim 5, wherein the vending machine system includes an authentication system for confirming that an item to be received in one of the bin assemblies is a legitimate $CO_2$ gas cylinder, said the system for performing the step of:

(a) confirming through the authentication system that the item to be received in step (ii) is a legitimate $CO_2$ gas cylinder.

* * * * *